United States Patent
Mochizuki

(10) Patent No.: US 8,363,695 B2
(45) Date of Patent: Jan. 29, 2013

(54) WIRELESS COMMUNICATION APPARATUS AND A RECEPTION METHOD INVOLVING FREQUENCY HOPPING

(75) Inventor: Takuji Mochizuki, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 935 days.

(21) Appl. No.: 12/436,270

(22) Filed: May 6, 2009

(65) Prior Publication Data

US 2009/0279588 A1 Nov. 12, 2009

(30) Foreign Application Priority Data

May 9, 2008 (JP) ................................ 2008-123513

(51) Int. Cl.
  *H04B 1/713* (2006.01)
  *H04B 7/08* (2006.01)
(52) U.S. Cl. ...................................... 375/136; 375/347
(58) Field of Classification Search .................. 375/132, 375/134, 136, 137, 347
  See application file for complete search history.

(56) References Cited

U.S. PATENT DOCUMENTS

| 7,429,904 | B2 * | 9/2008 | Trutna et al. | ................. 333/187 |
| 2003/0026198 | A1 * | 2/2003 | Diepstraten et al. | .......... 370/208 |

FOREIGN PATENT DOCUMENTS

| JP | 2700746 | 10/1997 |
| JP | 2005-210170 | 8/2005 |
| JP | 2006-020072 | 1/2006 |
| JP | 2006-121546 | 5/2006 |
| JP | 2006-203686 | 8/2006 |

* cited by examiner

*Primary Examiner* — Kevin Kim
(74) *Attorney, Agent, or Firm* — Young & Thompson

(57) ABSTRACT

Disclosed is a receiver of a direct conversion receiving scheme in which a packet is transmitted or received while performing frequency hopping for each symbol and demodulation is started by carrier sensing at the beginning of the packet, which performs demodulation without hopping frequencies of LOs of receiving systems to reliably execute fast carrier sensing and hopping synchronization at the beginning of the packet and remove the DC offset jump. At a time of demodulation of a payload part, the frequencies of LOs of the receiving system are hopped to allow a transition of MIMO. Further, by concurrently using complex bandpass filters while fixing all the LOs at a center LO frequency, complete removal of the DC offset jump over the entire length of the packet and MIMO can be simultaneously implemented.

10 Claims, 15 Drawing Sheets

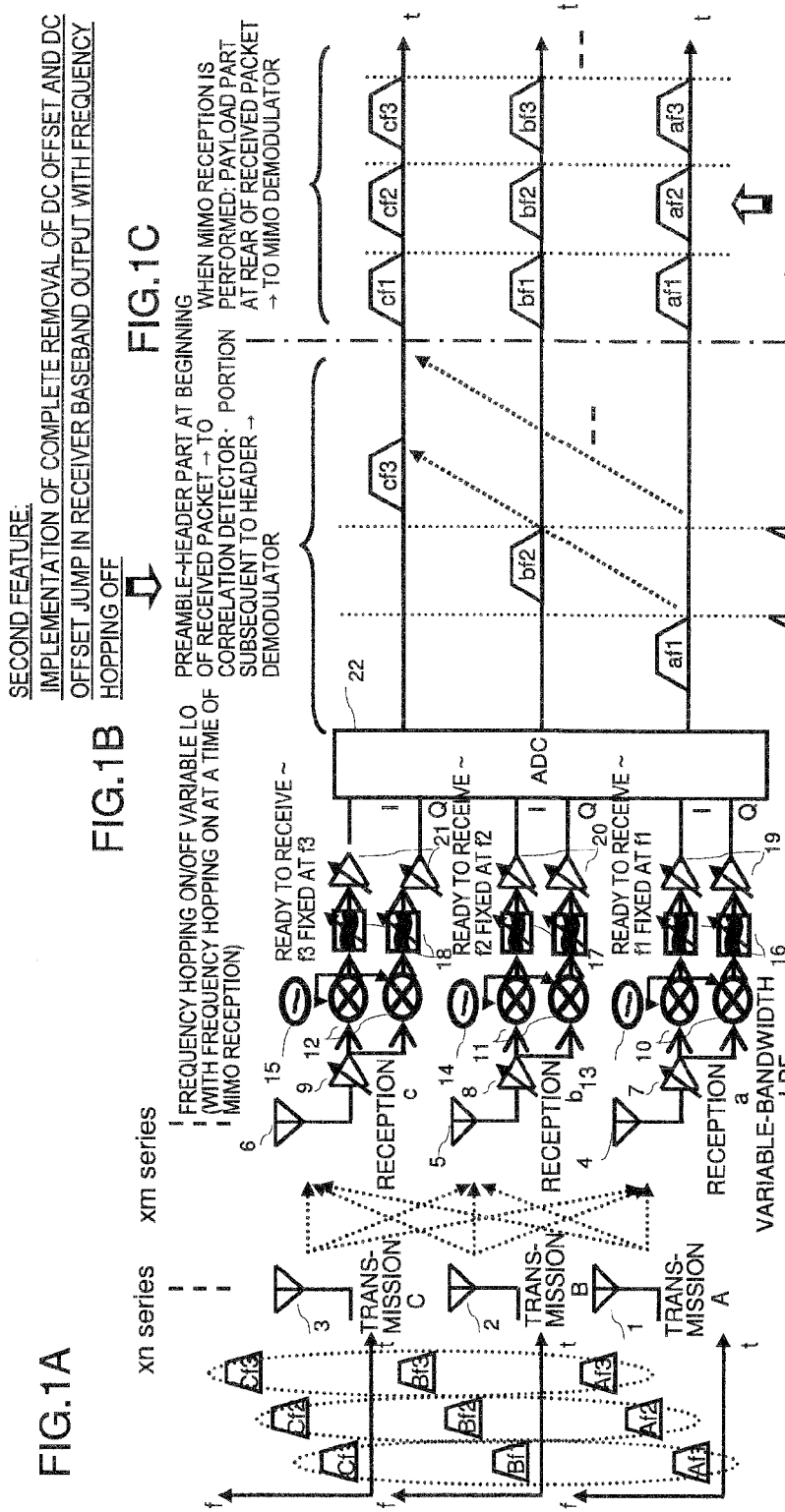

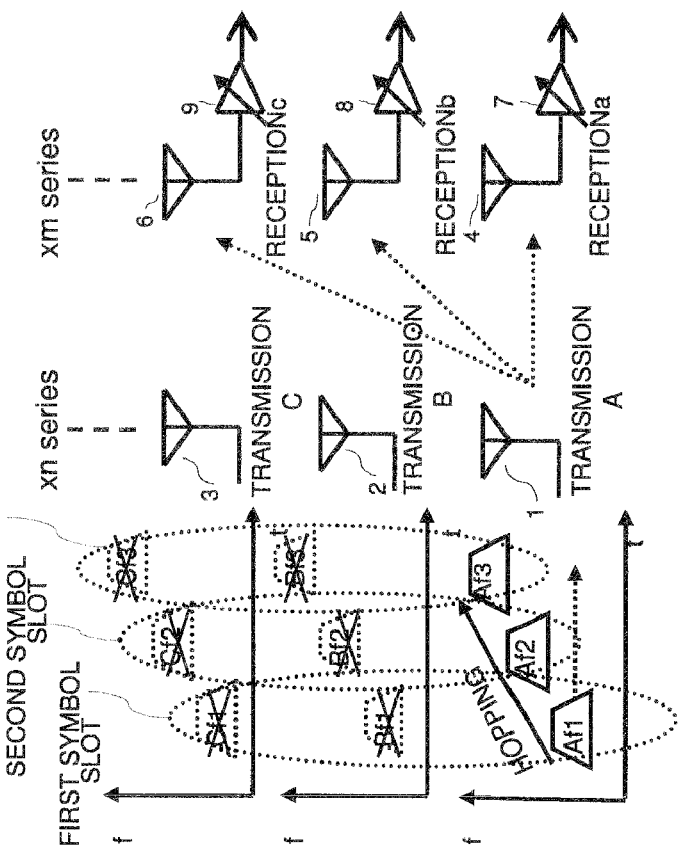
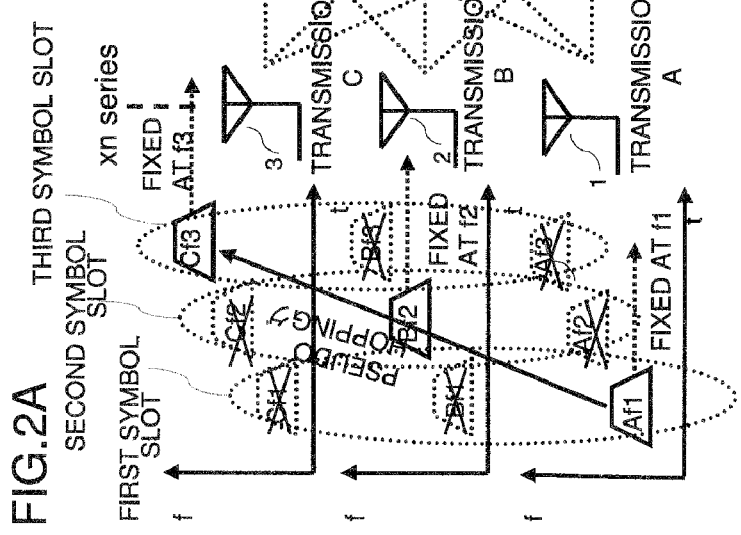

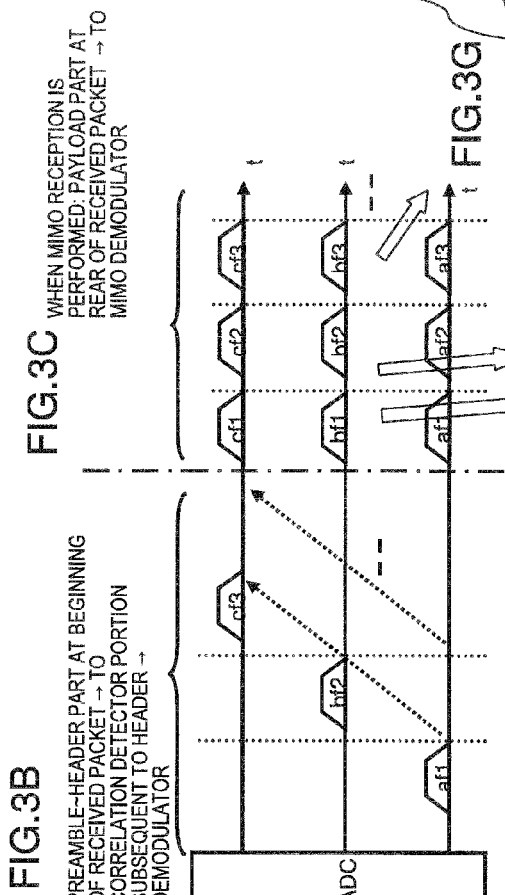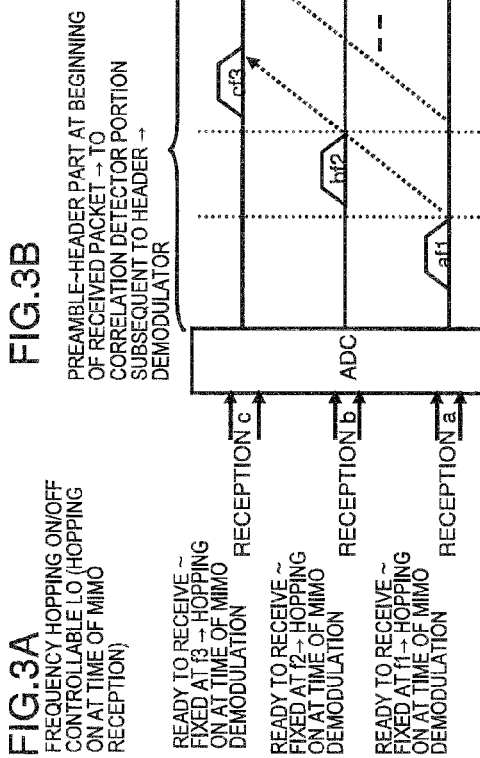

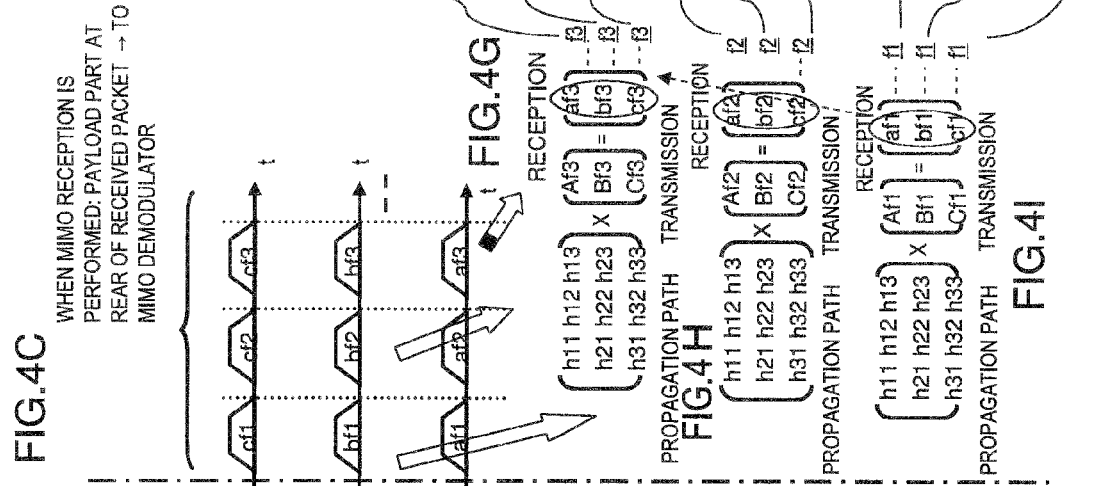
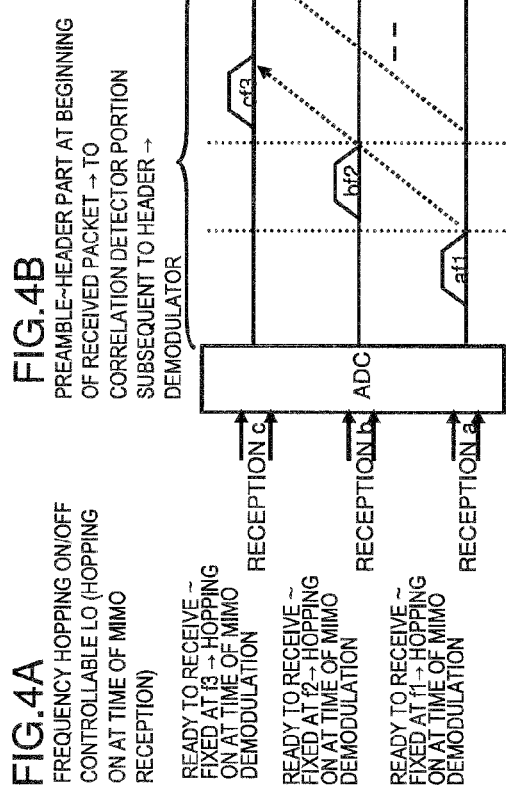

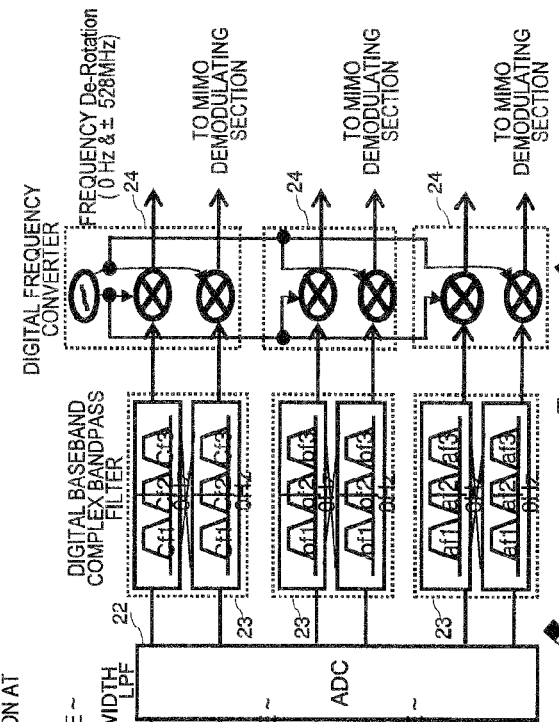
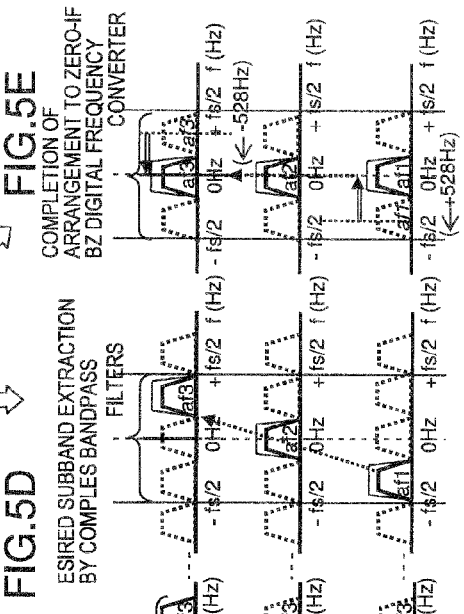
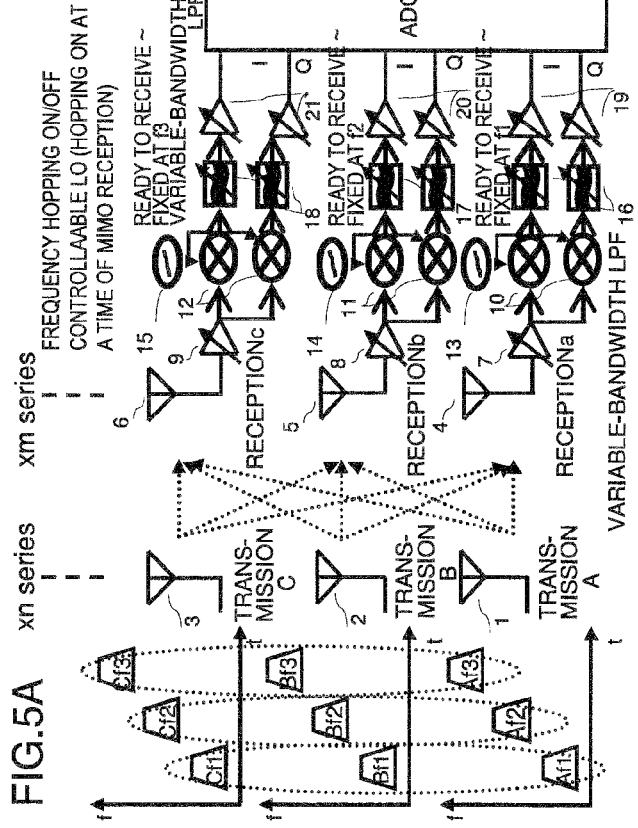
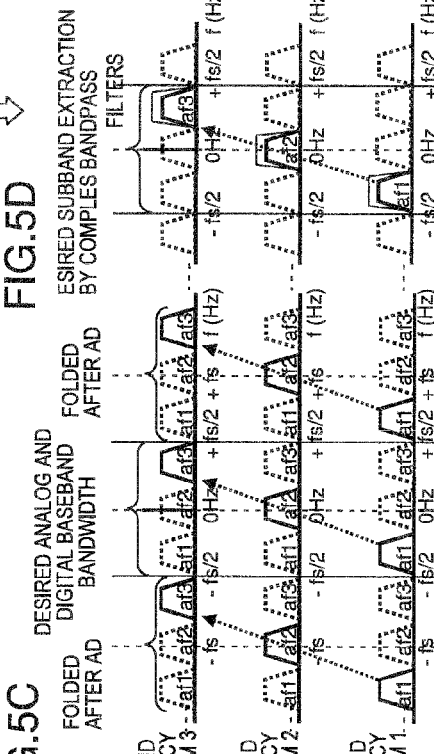

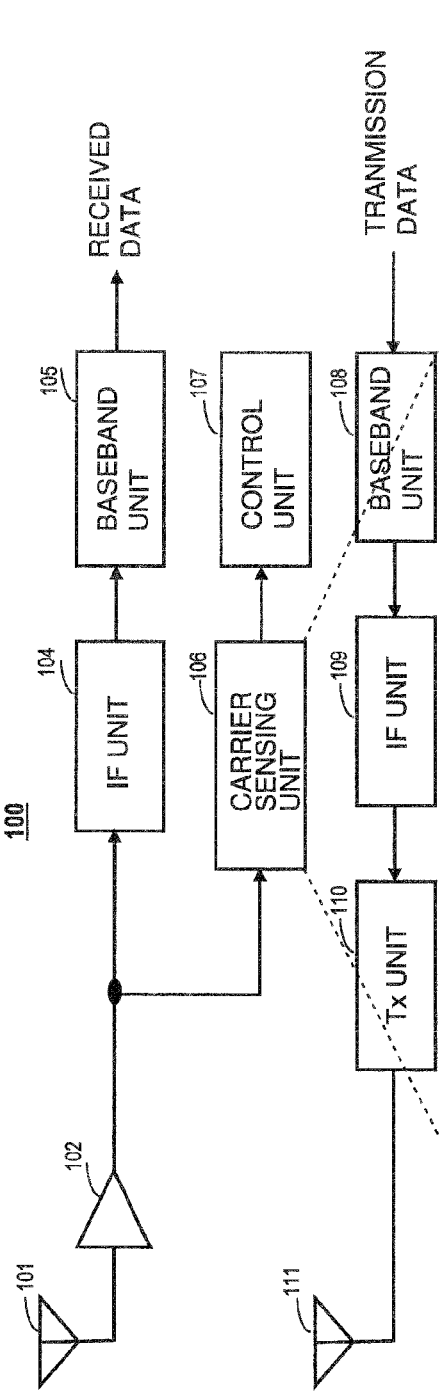
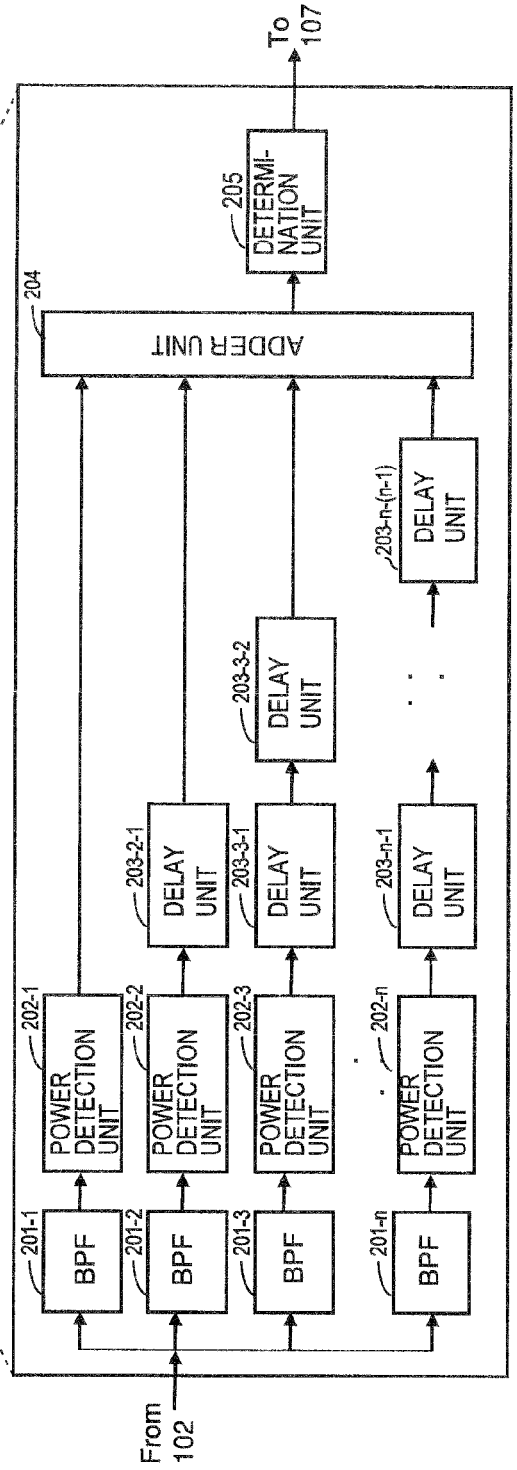

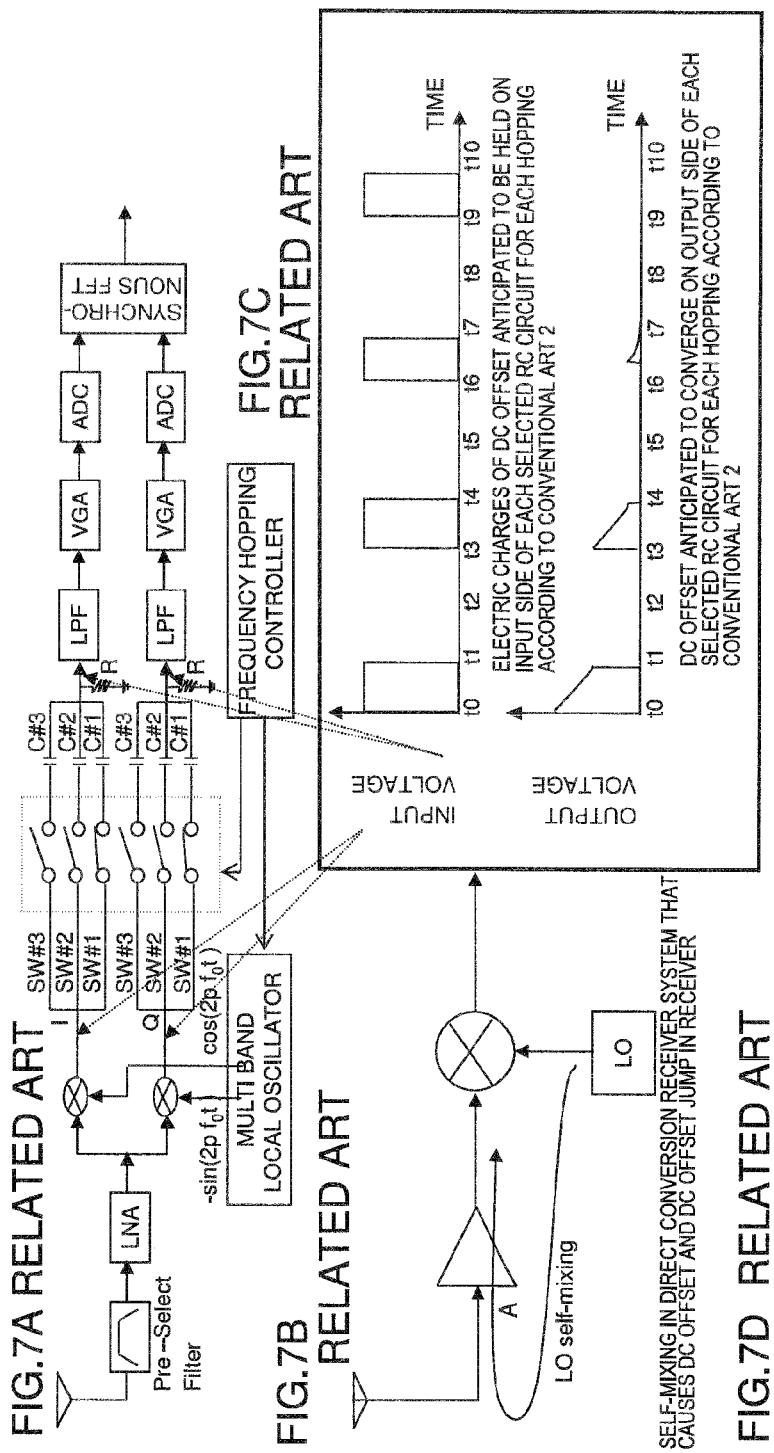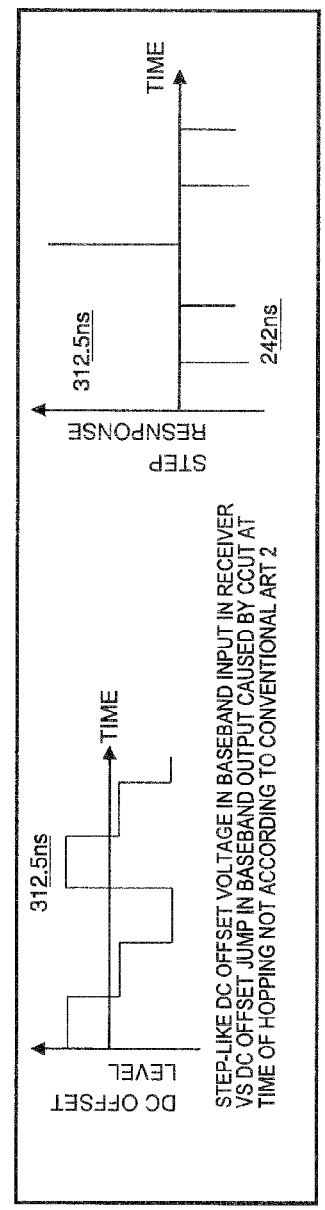

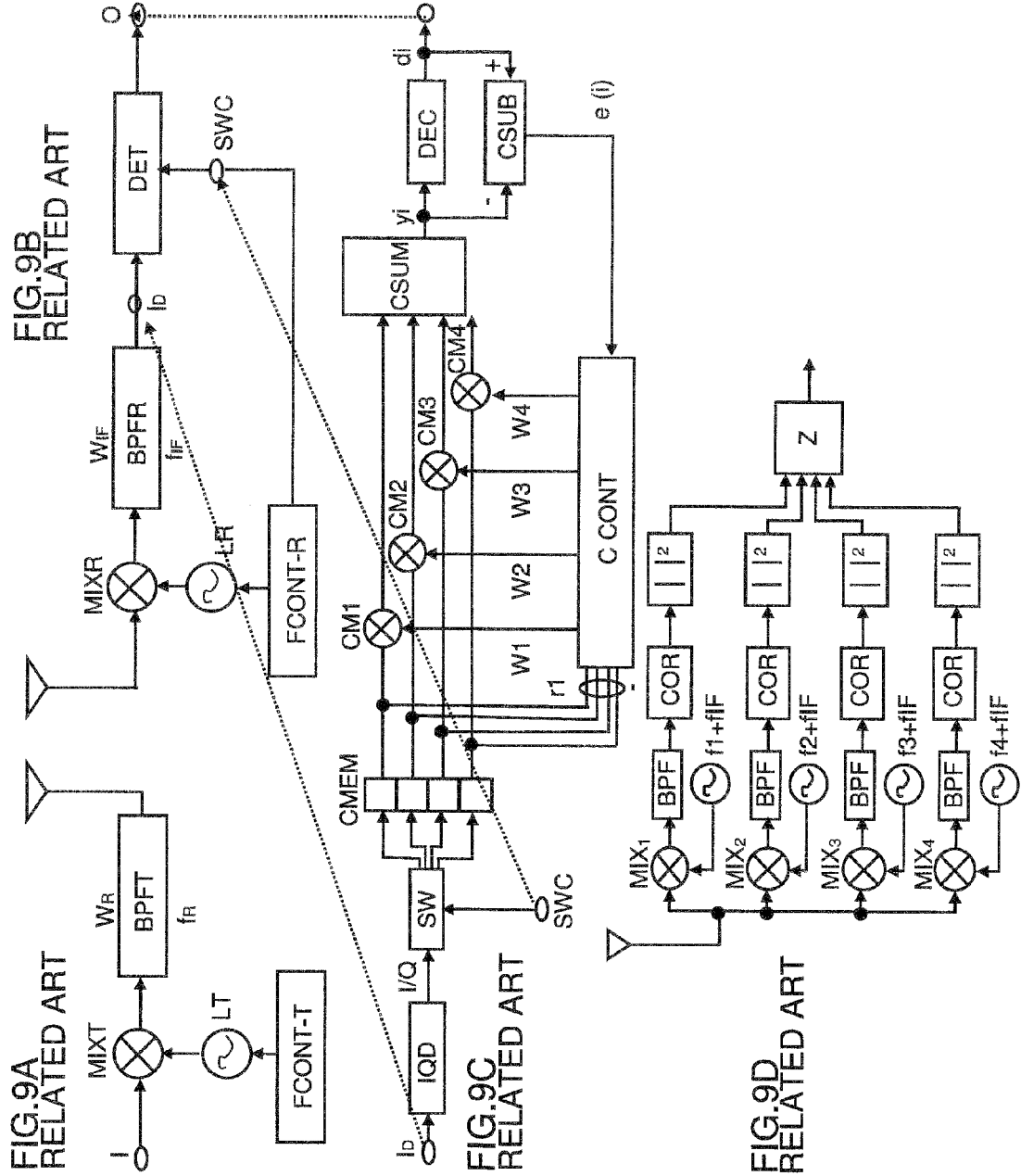

WIRELESS COMMUNICATION APPARATUS AND A RECEPTION METHOD INVOLVING FREQUENCY HOPPING

REFERENCE TO RELATED APPLICATION

This application is based upon and claims the benefit of the priority of Japanese patent application No. 2008-123513 filed on May 9, 2008, the disclosure of which is incorporated herein in its entirety by reference thereto.

TECHNICAL FIELD

The present invention relates to a wireless communication apparatus and a reception method involving frequency hopping. More specifically, the invention relates to a wireless communication apparatus having a receiver configuration and a reception method, suitable for use in a direct conversion receiving system. In the direct conversion receiving system, a packet is transmitted or received while performing frequency hopping for each symbol and demodulation on a receiver side is started by performing carrier sensing at the beginning of the packet.

BACKGROUND

In a receiver of a wireless communication apparatus which adopts the direct conversion receiving scheme (such as a Multi Band OFDM (Orthogonal Frequency Division Multiplexing) UWB (Ultra Wide Band) system compliant with a WiMedia standard, used as a PHY (physical layer) in Wireless USB, or the like), in which a packet is transmitted or received while performing frequency hopping for each symbol and demodulation on a receiver side is started bay performing carrier sensing at the beginning of the packet, it is an important technical challenge to perform correlation detection (CCA: Clear Channel Assessment detection) at a preamble part at the beginning of the packet received with frequency hopping, and further, AGC (Auto Gain Control)/AFC (Auto Frequency Control)/synchronization establishment stably at high speed. The correlation detection involves an operation from carrier sensing to synchronization and start of hopping. As such a high-speed correlation detection technique, a description in Patent Document 1, for example, is referred to.

Further, as a factor of fixed degradation of reception at a time of direct conversion reception involving frequency hopping, a DC (direct current) offset that occurs in a received baseband signal by self-mixing may be pointed out. Unless the DC offset that occurs in the receiver baseband portion is appropriately handled to be suppressed, the received signal and the DC offset may be both saturated due to a high gain of an analog baseband portion.

When a DC offset level differs for each frequency hopping, a jump in the DC offset occurs immediately after the hopping due to a DC cut-off capacitance element Ccut for preventing an increase in a DC signal in a stage subsequent to the analog baseband portion. The DC cut-off capacitance element Ccut performs high-pass filtering of subcarriers that are more distant than a subcarrier in the most vicinity of a DC component, based on nulling of the DC signal at a time of OFDM.

When the time constant of a transient response of the DC offset jump exceeds a zero padding period+a guard interval (70.1 nsec), which are non-signal periods, ISI (Inter-Symbol Interference: interference between symbols) is caused, and the non-signal periods are interfered. As a result, multi-path delay wave processing using cyclic prefix (Cyclic Prefix) cannot be simply performed. A remarkable fixed degradation of reception (that is, fixed degradation in a reception characteristic) is caused. Further, the DC offset jump occurs in a transient-response manner. Thus, once the DC offset jump has occurred, it becomes difficult to improve or solve degradation in the reception characteristic. A solution to such a problem of the DC offset jump is disclosed in Patent Document 2, or 3, for example.

A further increase in speed and capacity such as in a wireless packet communication apparatus is desired in the future in a trend toward ubiquitous broadband wireless communications. Then, importance is attached to technical continuity capable of solving each of the problems and achieving a higher speed with high robustness. A MIMO (Multi Input Multi Output) space division multiplexing method plays a part in the technical continuity. As clear from a subsequent description the present invention proposes a configuration of a receiver that solves the problems described above and may also assume a MIMO configuration. With this arrangement, improvement in performance and added value are supplied, while avoiding the above-mentioned problems.

An analysis of related arts by the present invention will be given below.

Patent Document 1 discloses configurations shown in FIGS. 6A and 6B as a frequency hopping wireless communication apparatus and a carrier sensing device in which a carrier sensing determination accuracy is high and the time needed for carrier sensing is short in a wireless communication system involving frequency hopping and carrier sensing. FIG. 6A corresponds to a configuration of the frequency hopping wireless communication apparatus in FIG. 1 in Patent Document 1. FIG. 6B corresponds to a configuration of a carrier sensing unit in FIG. 2 in Patent Document 1. The configurations and operation overviews of the frequency hopping wireless communication apparatus and the carrier sensing unit are as follows.

An RF (Radio Frequency) signal output from an LNA (Low Noise Amplifier) 102 is branched. A carrier sensing unit 106 performs carrier sensing by energy detection and correlation detection of RF signals. The carrier sensing unit 106 includes a plurality of bandpass filters (RF BPFs) 201 that can respectively pass frequency-hopped RF signals. For an output of an RF BPF 201 for each hopping frequency, an energy detector (power detection unit) and an RF correlation detector (auto-correlation unit) are arranged. With this arrangement, carrier sensing detection outputs that have been temporarily distributed on a time axis by hopping are detected without alteration. Delay units 203 for respectively compensating for delays corresponding to a hopping pattern are inserted. Finally, detection values for respective hopping symbols, which have been combined on time, axis by those delays, are integrated and added by an adder unit 204. Fast carrier sensing is sought by increasing the correlation value in an early processing stage.

When fast carrier sensing involving frequency hopping is implemented, it is assumed to perform energy detection or auto-correlation detection at an RF frequency at the time of branching of an RF signal. Thus, RF detection for each frequency hopping is needed. An increase in the number of the bandpass filters (RF BPFs) 201 associated with the RF detection and an increase in the circuit size, an increase in the cost, and an increase in power consumption due to a detection circuit configuration for each RF signal are brought about.

Next, a configuration of Patent Document 2 that aims at removal of DC offset in a baseband portion in a receiver in a Multi Band OFDM UWB direct conversion system that performs frequency hopping will be shown in FIG. 7. FIG. 7A corresponds to the configuration of a Multi Band OFDM UWB receiver in FIG. 5 in Patent Document 2. FIG. 7B corresponds to FIG. 9 (which is a diagram explaining local signal self-mixing) in Patent Document 2. FIG. 7C corresponds to FIG. 2 (which is a graph showing a relationship between an input voltage and an output voltage in a band #1) of Patent Document 2. FIG. 7D corresponds to FIG. 10 (which is a graph explaining a DC offset generated by self-mixing) and FIG. 12 (which is a graph explaining a convergence time of a step response of the DC offset) in Patent Document 2. Explanation sentences added to FIGS. 7C and 7D are not present in Patent Document 2 and are added by the inventor of the present invention for explanation. The configuration and an operation overview of the receiver in FIG. 7 are as follows.

For respective frequency bands #1, #2, and #3, where frequency hopping is performed, capacitors #C1, #C2, and #C3 are respectively provided in series with series switches SW#1, SW#2, and SW#3 for path selection on baseband signal I/Q (In-Phase/Quadrature) lines in a receiver of a direct conversion receiving scheme. A resistance R is connected in shunt between the GND and an output of the capacitors #C1, #C2, and #C3, as a common output load. That is, a first-order RC HPF (High Pass Filter) circuit configuration is inserted into a baseband portion. The cutoff frequency of the HPF is set to a level capable of passing a subcarrier in the most vicinity of a DC component. Thus, the time constant of several symbols is needed.

According to the circuit in FIGS. 7A and 7B, capacitor switching is made in synchronization with the frequency hopping. Immediately before the frequency hopping from the frequency band #1 to other frequency band #2, the capacitor C#1 holds electric charge of a DC offset in the form of a step voltage. When the hopping is performed again to the frequency band #1, the circuit is operated to perform path connection so that a step voltage response is continued at the capacitor C#1. It is explained that, with this operation, a transition is made so that charging/discharging at the capacitor C#1 is to disappear after several hopping cycles, and an output of each RC circuit selected for each frequency hopping is stabilized at a steady state without DC offset.

Assume that removal of DC offset jump in the receiver is sought while fast frequency hopping is performed. Especially when fast frequency hopping is performed at a rather high speed as in the Multi Band OFDM UWB (Multi Band OFDM UWB) system, an approach to switching charging/discharging of the analog RC circuit by a switch is a sheer analog approach. Thus, rather close on/off path control is needed for the approach; A complete and stable cancelling effect assuming mass production in view of a malfunction at a time of path switching or variations in elements, operation, and temperature may not be able to be guaranteed.

In an OFDM receiver in the direct conversion system, an OFDM signal wave does not include a subcarrier signal with a center frequency, in general. That is, a DC component in a received baseband signal becomes Null (zero). Thus, it is possible to cut off DC offset amplification using the DC cut-off capacitance element Ccut.

Patent Document 2 is also based on a configuration in which the DC cut-off capacitance element Ccut is inserted. In this case, however, it is necessary to set the cut-off frequency of the first-order RC HPF using the DC cut-off capacitance element Ccut and the load R to be low so that the subcarrier in the most vicinity of the Null DC component is not suppressed. Consequently, the RC time constant would be increased to a period that extends over several symbols. For this reason, when the DC offset jump occurs, the DC offset jump for a long time of several OFDM symbols will be caused.

When the DC offset jump is made to converge by switching a path for the direct cutting capacitance element Ccut for the received baseband signal I/Q for each hopping and eliminating an electric charge transfer at the DC cut-off capacitance element Ccut for each hopping, convergence of the DC offset jump in an output of the DC cut-off capacitance element Ccut is determined by the RC time constant. It needs a period equivalent to several OFDM symbols. Thus, the DC offset jump cannot be immediately cancelled at the beginning of a received packet.

Patent Document 3 discloses a configuration in FIG. 8 (corresponding to FIG. 1 in Patent Document 3), in which a multi band OFDM_UWB transmitter/receiver is set to a Low-IF (intermediate frequency: intermediate frequency) to solve the problem in the transmitter/receiver in the direct conversion system. By performing rearrangement that rotates subcarriers after an FFT (Fast Fourier Transform) in the Low-IF receiver, the need for frequency conversion using a second local signal is eliminated. An AD conversion clock that is the same as in a direct conversion receiver is also used. On the other hand; detection at a preamble part to which the FFT is not applied can be performed by using a sequence obtained by multiplying an original preamble pattern by an IF frequency in advance.

Patent Document 4 discloses configurations in FIG. 9. FIG. 9A corresponds to FIG. 1 in Patent Document 4 (which is a block diagram of a transmitting device). FIG. 9B corresponds to FIG. 2 in Patent Document 4 (which is a block diagram of a receiving device). FIG. 9C corresponds to FIG. 3 of Patent Document 4 (which is a block diagram of a demodulation circuit). FIG. 9D corresponds to FIG. 12 in Patent Document 4 (which is a block diagram of a related art receiving device). Patent Document 4 explains a configuration of a correlation detector on a receiver side in the case of a modulation/demodulation system that uses a fast frequency hopping (Fast Frequency Hopping) method for frequency spreading and correlation detection. The fast frequency hopping method is a type of (CDMA (Code Division Multiple Access)/SS transmission method. The correlation detector uses a wireless transmission system in which 1/0 symbols are expressed as frequency hopping patterns of a combination of a plurality of frequencies. The correlation detection on the receiver side has been hitherto performed by non-coherent detection (scheme in which K different transmission hopping carrier frequencies have no phase continuity before and after hopping and phase synchronization is not achieved on a receiver side as well, which means that LO frequencies on the receiver side are not phase synchronized with the transmission carrier frequencies). Patent Document 4 proposes the frequency hopping system in which correlation detection on the receiver side is performed by coherent detection while securing phase continuity among hopping carriers on a transmitting side, thereby aiming at improvement of reception sensitivity performance by 6 dB (which is equivalent to improving a required C/N ratio by 6 dB) theoretically.

The configuration of this receiver adopts a single conversion method. A first LO frequency on the receiver side is hopped with K frequency patterns which are the same as in transmission, for supply to a synthesizer (MIX), in the form of frequencies f1+fIF, f2+fIF, . . . fK+fIF. Each of received signals down-converted to an IF band assumes the same IF frequency when hopping synchronization between the transmitter and receiver sides has been completely obtained. This signal resulting from this conversion undergoes complex (I/Q) envelope detection by a quasi-synchronization detector, and is the divided into K complex envelopes by a time-series switch. Then, the K complex envelopes are respectively multiplied by K complex coefficients. Then, using a minimum square method, one complex envelope is computed from synthesis using the K complex envelopes, and symbol determination is made by a determination circuit. In that case, by automatically controlling the K complex coefficients so that an input/output error of the determination circuit is eliminated, an optimal reception status is adaptively maintained. That is, this operation is equivalent to coherent detection continuously involving phase synchronization.

It is described that this receiver has a configuration having LOs (local oscillators) of which respective hopping frequencies are fixed and MIXs (mixers) in order to extract the frequency hopping pattern of an incoming hopped received wave. This receiver is not based on the direct conversion scheme. A synthesized output (mixer output) has an IF frequency, and this receiver is based on the single conversion scheme.

It has been typically desired that, when frequency hopping is performed in the Multi Band OFDM UWB system, an LO unit complete the frequency hopping within a zero segment (of a total of 37 clocks equivalent to 70.1 nsec) that is present in each hopping symbol (of an effective FFT (Fast Fourier Transform) length of 128 clocks equivalent to 242.4 nsec), and further within a guard interval segment (of 5 clocks of 9.5 nsec) sandwiched between two types of zero padding segments (of a total of 32 clocks equivalent to 60.6 nsec) in the zero segment. It is highly difficult to perform LO frequency switching within such a short period. Generally, it has been considered to be difficult to perform frequency switching within a period of 9.5 nsec due to the influence of the stray capacitance of a high-speed frequency switching switch and a transmission path even if the switch is provided. In order to solve this problem, Patent Document 5 provides a Multi Band OFDM UWB wireless receiver device capable of implementing frequency hopping without using the high-speed frequency switching switch. FIGS. 10A, 10B, 10C, 10D, 10D and 10F are respectively reproductions of FIGS. 1, 2, 3, 4, 5, and 6 in Patent Document 5.

As a basic receiver configuration, three sub-hands are shared by a switch, a BPF, and an LNA before QDEMs for direct conversion. The switch, BPF, and LNA are implemented as one system. Three systems corresponding to the number of frequency hoppings are implemented in chains from an analog baseband portion after the QDEMs to AD converters. Then, a LO frequency is fixed for each hopping band in advance, and the receiver is set to a ready state for reception. In this configuration, frequency hopping is completely eliminated. As the other configuration, a configuration where frequency hopping is sequentially performed is used. In the other configuration, blocks are implemented after the QDEMs in two systems (in FIGS. 10C, 10D, 10F: FIGS. 3, 4, and 6 in Patent Document 5), and a symbol segment immediately before a next symbol is used to cope with another remaining Band hopping, and frequency switching for an unused QDEM/LO system on one side is performed with a sufficient time allowance taken for a next hopping frequency, thereby performing hopping on the receiver side one after another. Further, switches are respectively provided after I/Q baseband AD converters (three pairs of the I/Q baseband AD converters in first and three exemplary embodiments in Patent Document 5 and two pairs of the I/Q baseband AD converters in second and fourth exemplary embodiments in Patent Document 5) each provided for each receiver chain after each QDEM in each exemplary embodiment. Each of two series of I/Q symbol sequences output from the respective AD converters as a result of each hopping (each symbol sequence being composed of 165 or 192 quantized elements quantized by each AD converter) is temporarily stored in one or more shift registers (one shift register being implemented for each I/Q signal in the first and second exemplary embodiments in Patent Document 5 and three shift registers being implemented for each I/Q signal in the third and fourth exemplary embodiments in Patent Document 5) before an FFT. Then, a cyclic prefix process is applied in order to cope with a delay wave caused by multi-path fading. Then, the FFT is applied one after another in the order of hopping symbols.

A secondary effect other than provision of fast hopping replacement means in Patent Document 5 is as follows. When a delay spread caused by multi-path fading generated according to various propagation environments becomes equal to or larger than an interframe space (of 70.1 nsec) between adjacent effective symbols, which is a sum of the zero padding segment and the guard interval segment, interference between the symbols occurs. Degradation in manifest reception characteristics is thereby caused.

in the configuration in Patent Document 5, quantized elements of an I/Q symbol sequence corresponding to each hopping frequency after AD conversion (sampling elements quantized by each AD converter) are temporarily stored in the one or more shift registers provided in a digital baseband space before the FFT. Then, the cyclic prefix process for recovering a loss caused by a delay can be slowly performed at discontinuous symbol intervals for the each hopping frequency. Thus, the third and fourth exemplary embodiments in Patent Document 5 have an effect that fading compensation for a multi-path delay wave (for which a maximum allowable delay being 64 clocks/121.2 nsec) longer than an allowable value that can be compensated for in most instances (where the zero padding segment is a total of 32 clocks/60.6 nsec+the guard interval is 5 clocks/9.5 nsec, totaling 37 clocks/70.1 nsec) can be performed using the cyclic prefix process.

When the third and fourth exemplary embodiments in Patent Document 5 are improved and the FFT can be applied for each shift register, there is also a possibility that at a time of 3 Band hopping, cyclic prefix compensation can be performed within a frame of an effective FFT length of 242.4 nsec after a maximum 695.1 nsec multi-path delay in the improvement of the third exemplary embodiment in Patent Document 5 and a maximum 382.6 nsec multi-path delay in the improvement of the fourth exemplary embodiment in Patent Document 5 have been once stored.

[Patent Document 1]
  JP Patent Kokai Publication No. JP-P-2005-210170A
[Patent Document 2]
  JP Patent Kokai Publication No. JP-P-2006-203686A
[Patent Document 3]
  JP Patent Kokai Publication No. JP-P-2006-121546A
[Patent Document 4]
  JP Patent No. 2700746
[Patent Document 5]
  JP Patent Kokai Publication No. JP-P-2006-20072A

SUMMARY

The entire disclosure of Patent Documents 1 to 5 are incorporated herein by reference thereto. Problems of the related arts described above will be described below.

In the receiver of the wireless communication apparatus that adopts the direct conversion receiving scheme (such as the Multi Band OFDM UWB system compliant with the WiMedia standard, used as the PHY (physical layer) in the Wireless USB), it is the important challenge to perform correlation detection (CCA: Clear Channel Assessment detection) at the preamble portion at the beginning of a packet received with frequency hopping and further AGC, AFC, and synchronization establishment stably and at high speed. In the direct conversion receiving system, the packet is transmitted or received while performing frequency hopping for each symbol, and demodulation oil a receiver side is started by performing carrier sensing at the beginning of the packet. The correlation detection involves an operation from carrier sensing to synchronization and start of hopping. When fast carrier sensing involving frequency hopping is sought in Patent Document 1, the RF signal is branched, and energy detection or auto-correlation detection at the RF frequency is conceived. Thus, RF detection for each frequency hopping is needed, thereby bringing about an increase in the number of RF BPFs and an increase in the circuit size due to the detection circuit configuration for each RF signal, an increase in the cost, and an increase in power consumption.

It is required that high-speed correlation detection and acknowledgement of a hopping pattern timing for a plurality of digital baseband units in a plurality of receiving systems in the receiver be performed more simply and more reliably.

Further, as a factor for fixed degradation of the reception at a time of direct conversion reception involving frequency hopping, a DC (direct current) offset that occurs in a received baseband signal by self-mixing may be pointed out. Unless the DC offset that occurs in the received baseband signal is appropriately handled to be suppressed, the received signal and the DC offset may be both saturated due to a high gain of an analog baseband portion. When a DC offset level differs for each frequency hopping, DC offset jump occurs immediately after the hopping due to cutting-off for preventing a DC signal increase in a stage subsequent to the analog baseband portion (high-pass filtering of subcarriers that are more distant than a subcarrier in the most vicinity of a DC component, based on nulling of the DC signal at a time of the OFDM). This jump occurs in a transient-response manner. Thus, once the DC offset jump has occurred, it becomes difficult to improve or solve degradation in the receiver.

A solution to the problem of the DC offset jump, is proposed by Patent Documents 2 and 3.

Assume, in Patent Document 2, the case where removal of DC offset jump in the receiver is sought while fast frequency hopping is accompanied. Especially, when fast frequency hopping is performed at a rather high speed as in the Multi Band OFDM UWB system, an approach to switching charging/discharging of the analog RC circuit by the switch is a pure analog approach. Thus, rather close on/off path control is needed for the approach. For this reason, a complete and stable cancelling effect assuming mass production in view of a malfunction at a time of path switching or variations in elements, operation, and temperature may not be able to be guaranteed.

In the OFDM receiver in the direct conversion system, the OFDM signal wave does not include a subcarrier signal with a center frequency, in general. That is, a DC component in a received baseband signal becomes Null (zero). Thus, it is possible to cut off DC offset amplification using the DC cut-off capacitance element Ccut. Patent Document 2 is also based on a configuration in which the DC cut-off capacitance element Ccut is inserted. In this case, however, it is necessary to set the cut-off frequency of the first-order RC HPF using the DC cut-off capacitance element Ccut and the load R to be low so that the subcarrier in the most vicinity of the Null DC component is not suppressed. As a result, the RC time constant would be increased to a period that extends over several symbols. For this reason, when the DC offset jump occurs, the DC offset jump for a long time of several OFDM symbols will be caused. For this reason, in the exemplary embodiment in Patent Document 2, a path for the direct cutting capacitance element Ccut for the received baseband signal I/Q is switched for each hopping and an electric charge transfer at the DC cut-off capacitance element Ccut for each hopping is eliminated thereby making the DC offset jump to converge. Nevertheless, it needs a period equivalent to several OFDM symbols to make the DC offset jump in an output of the DC cut-off capacitance element Ccut to converge. The convergence of the DC offset jump is determined by the RC time constant. In this case, the DC offset jump cannot be immediately cancelled at the beginning of a received packet. That is, it is requested that the DC offset/DC offset jump be removed from the beginning of the received packet more simply and completely to get the best receiving performance.

Patent Document 3, which aims at removal of DC offset jump in a baseband portion in the receiver, is proposed to provide improvement in terms of the DC offset jump in the receiver and other problems. In order to do so, transmission and reception PHY layers, an architecture, and a main system configuration are changed and fixed at a "Near-Zero IF system".

By setting the hopping frequency of an LO (local oscillator) signal to just a frequency (boundary frequency) in the center of spacing between received hopping modulated waves, the received modulation waves down-converted to an analog baseband are placed in a Near-Zero IF region which extends in a minus frequency direction from 0 Hz. This frequency arrangement can reduce the time constant of the DC offset protecting Ccut inserted into the analog baseband. Thus, the transient response time of the DC offset jump is minimized (to approximately 30 nsec). Accordingly, even at a time of hopping in the receiver, degradation of reception characteristics due to the DC offset jump can be designed not to be caused.

This is the greatest feature of the invention in Patent Document 3. However, even with this approach, the DC offset jump cannot be eliminated. Even if the transient response time can be reduced, a voltage step response in an input to the DC cut-off capacitance element Ccut at a time of hopping in the receiver is large when a DC offset amount greatly differs for each hopping frequency in the receiver because of the manufacturing process of an LSI or the like and circuit design. The magnitude of an impulse response wave of an output of the DC cut-off capacitance element Ccut at a time of the DC offset sump may remain high. When a transient response dropping characteristic to response to this high impulse response value cannot be secured, reception characteristics would be greatly degraded due to the DC offset jump. Further, even if the transient response of the DC offset jump can be made fast, the jump is still present on the zero padding and guard interval segments. Thus, the cyclic prefix process where a multipath delay wave that has leaked into a non-signal segment is cut out to be inserted into an effective FFT symbol segment cannot be simply performed. In view of this respect as well, the reception characteristics will be degraded.

When the sampling frequency of an AD converter is kept at a received modulated wave bandwidth, frequency folding that is symmetrical with respect to 0 Hz is generated. Then, positive and negative SSBs (Single Side Bands) appear like a mirror image with respect to 0 Hz. Using this phenomenon, Patent Document 3 rearranges subcarriers after the FFT and brings the subcarriers down to the Zero-IF baseband. With this frequency folding and subcarrier rearrangement, there is provided an advantage that the need for frequency shift using a 2nd LO signal in a digital baseband unit is eliminated.

However, before frequency folding in a plus side baseband frequency direction is performed by AD conversion, it is necessary to sufficiently suppress an image bandwidth on a plus frequency side for a received baseband wave that is present in the Near-Zero IF region which extends in a minus frequency direction from 0 Hz, in an analog baseband portion in advance in order to clean up the image bandwidth.

It is necessary to insert into the analog baseband portion analog-based complex BPFs (Hilbert BPFs) capable of making distinction between positive and negative baseband frequencies and suppressing the positive and negative baseband frequencies, in order to sufficiently remove an adjacent receiver channel (Ch) interference wave and the like in this plus side baseband frequency bandwidth.

This insertion of the analog-based complex BPFs is a significant structural feature, and is also a factor for an increase in the complexity and size of the wireless transceiver that also performs transmission.

In an exemplary embodiment in Patent Document 3, for example, as a result of setting the receiver side to the configuration of the frequency described above, a transmitter side configuration is made complex. In order to form a modulated wave on a frequency side equal to or lower than 0 Hz in a digital baseband region, frequency rotation equivalent to Near-Zero If frequency conversion on the receiver side is applied. Then, analog IF conversion is performed by DAC's (digital-to-analog converters). In an analog baseband portion, several folded spectra in accordance with an envelope for the Sine function asymmetrically appear in upper and lower IF frequency bandwidths, with an aperture effect of the DACs. These unwanted spectra asymmetrically folded with respect to 0 Hz need to be suppressed before being up converted (Up Converted) by QMODs. Thus, a Hilbert BPF must be inserted for either of I and Q axes. Patent Document 3 is not desirable in that an increase in the circuit size and an increase in power consumption on the receiver side are also brought about.

In view of the problems in Patent Documents 2 and 3, implementation of a technique that compensates for a DC offset/DC offset jump more simply and completely is desired.

In addition to solution to the problems, a further increase in speed and capacity such as in the wireless packet communication apparatus is desired in the future in the trend toward ubiquitous broadband wireless communications. Thus, added importance is provided to the technical continuity capable of solving each of the problems and achieving a higher speed with robustness. The MIMO (Multi Input Multi Output) space division multiplexing method plays a part in the technical continuity.

The present invention has been invented in view of the problems described above. An object of the present invention is to provide a reception method and a wireless communication apparatus that stably and speedily performs correlation detection (CCA: Clear Channel Assessment detection) at a preamble part at the beginning of a packet received with frequency hopping and further AGC (Auto Gain Control), AFC (Auto Frequency Control) and synchronization establishment and prevents occurrence of a DC offset jump immediately after frequency hopping in a receiver of the wireless communication apparatus that adopts a direct conversion receiving scheme. In the direct conversion receiving system, the packet is transmitted or received while performing frequency hopping for each symbol and demodulation on a receiver side is started by performing carrier sensing at the beginning of the packet. The correlation detection involves an operation from carrier sensing to synchronization and start of hopping. In addition to achieving the above-mentioned object, another object of the present invention is to provide a receiver capable of achieving a further increase in speed and capacity using the MIMO space division multiplexing method.

In order to solve the problems described above, the invention disclosed in this application is generally configured as follows.

According to one aspect of the present invention, in a wireless communication apparatus in a direct conversion receiving system in which a packet is transmitted or received while performing frequency hopping for each symbol, and demodulation is started by performing carrier sensing at the beginning of the packet on the side of a receiver, the frequency of a local oscillator in each of a plurality of receiving systems is set to be fixed at each hopping frequency, the plurality of receiving systems being provided in accordance with the number of frequency hoppings;

carrier sensing is performed by a digital baseband unit using a predetermined number of symbols in a preamble part at the beginning of the packet received with frequency hopping; and a payload/data part is demodulated after an operation from hopping pattern detection to hopping synchronization on the receiver. In the present invention, the cut-off bandwidth of a variable band low-pass filter included in a baseband portion in each of the receiving systems is set to be narrow during processing on and demodulation of a portion from the preamble part to a header part.

According to another aspect of the present invention, there is provided a wireless communication apparatus in a direct conversion receiving system in which a packet is transmitted or received while performing frequency hopping for each symbol, and demodulation is started by performing carrier sensing at the beginning of the packet on the side of a receiver. In the wireless communication apparatus, a plurality of local oscillation signals of receiving systems are not frequency hopped at a time of demodulation of a portion from a preamble to a header at the beginning of the packet, but a local oscillation signals of each receiving system is frequency hopped at a time of demodulation of a payload/data part, thereby making a transition to a demodulating operation based on MIMO (Multiple Input Multiple Output) space division multiplexing. In the present invention, the cut-off bandwidth of a variable band low-pass filter included in a baseband portion in each of the receiving systems is set to be narrow at a time of demodulation of the payload/data part following processing on the portion from the preamble to the header.

According to still another aspect of the present invention, there is provided a wireless communication apparatus in a direct conversion receiving system in which a packet is transmitted or received while performing frequency hopping for each symbol, and demodulation is started by performing carrier sensing at the beginning of the packet on the side of a receiver, wherein:

a plurality of local oscillation signals in receiving systems are not frequency hopped at a time of demodulation of a portion from a preamble to a header at the beginning of the packet;

the plurality of local oscillation signals in the receiving systems are not hopped also at a time of demodulation of a payload/data part following the demodulation of the portion from the preamble to the header; and a center frequency is selected from among frequencies of the local oscillation signals and is applied in common to all the local oscillation signals in the receiving systems, thereby performing a demodulating operation based on MIMO space division multiplexing.

In the present invention, all the local oscillation signals in the receiving systems are fixed at one frequency in the center of the frequencies of the local oscillation signals, and when a symbol in a time zone where a transmission hopping frequency is a frequency other than the frequency of the local oscillation signals is demodulated, the cut-off bandwidth of a variable-band low-pass filter provided in a baseband portion in each of the receiving systems is widened or narrowed, thereby allowing reception of a near zero intermediate (Near Zero IF) baseband signal responsive to a difference between the transmission hopping frequency and the frequency of the local oscillation signals after an AD) converter; and the wireless communication apparatus includes complex bandpass filters and a digital frequency converter in a digital baseband unit after the AD converter, and extracts and demodulates modulated symbols corresponding to zero frequency and positive and negative baseband frequencies.

The meritorious effects of the present invention are summarized as follows.

According to the present invention, in the receiver of the wireless communication apparatus in the direct conversion receiving system in which a packet is transmitted or received while performing frequency hopping for each symbol and demodulation is started by performing carrier sensing at the beginning of the packet on the side of the receiver, correlation detection (CCA: Clear Channel Assessment detection) at the preamble part at the beginning of the packet received through the frequency hopping, or an operation from carrier sensing to synchronization and start of hopping, and further AGC (Auto Gain Control)/AFC (Auto Frequency Control)/synchronization establishment can be stably performed at high speed. The problem of occurrence of DC offset jump immediately after the frequency hopping can be thereby solved.

Further, according to the present invention, a further increase in speed and capacity can be obtained by a MIMO space division multiplexing method.

BRIEF DESCRIPTION OF THE DRAWINGS

FIGS. 1A to 1E are diagrams showing a configuration of a first exemplary embodiment of the present invention;

FIGS. 2A to 2D are diagrams showing settings of symbol transitions and frequency hopping in a portion from a preamble to a header at the beginning of a packet on a transmitter side in the first exemplary embodiment;

FIGS. 3A to 3I are diagrams for explaining an operation in FIG. 1;

FIGS. 4A to 4I are diagrams for explaining an operation in FIG. 1;

FIGS. 5A to 5E are diagrams explaining a configuration and an operation in a second exemplary embodiment of the present invention;

FIGS. 6A and 6B are diagrams explaining a related art (configuration and operation disclosed in Patent Document 1);

FIGS. 7A to 7D are diagrams explaining a related art (configuration and operation disclosed in Patent Document 2);

FIGS. 9A to 9D are diagram-s explaining a related art (configuration and operation disclosed in Patent Document 4)

PREFERRED MODES

Figure 8:
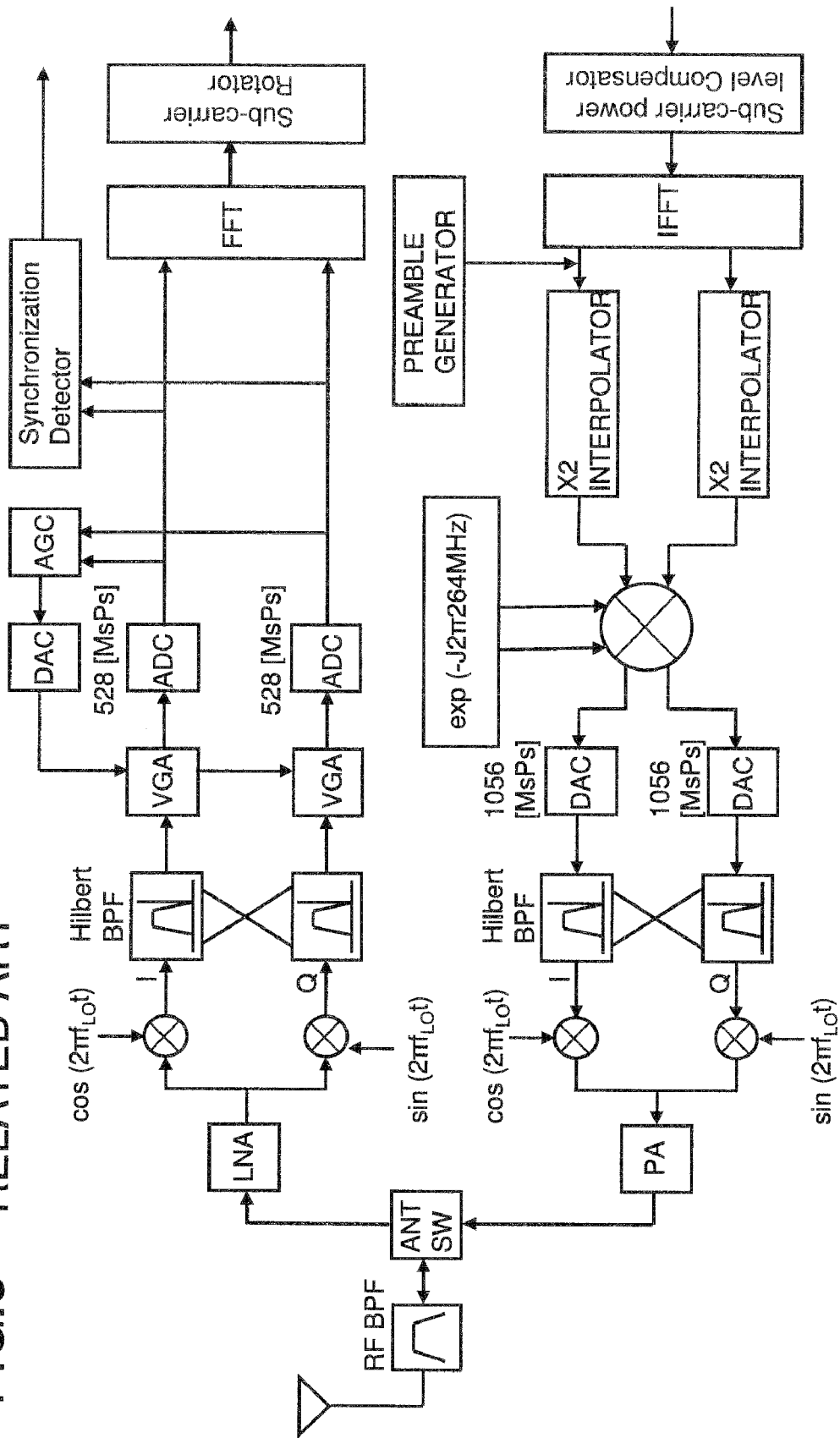
FIG. 8 is a diagram explaining a related art (configuration and operation disclosed in Patent Document 3)
Figure 10A:
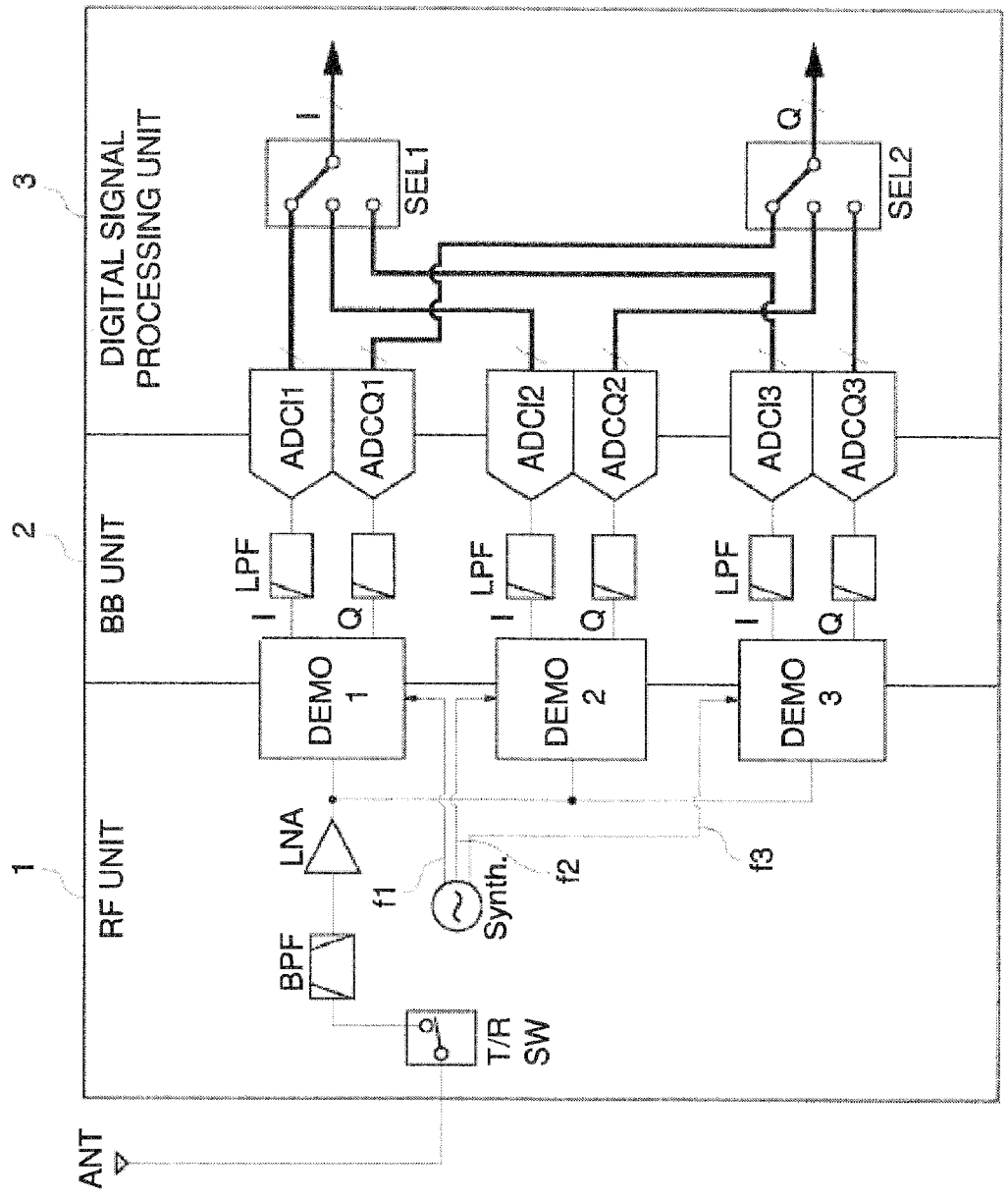
FIGS. 10A to 10F are diagrams explaining a related art (configuration and operation disclosed in Patent Document 5).
Figure 10B:
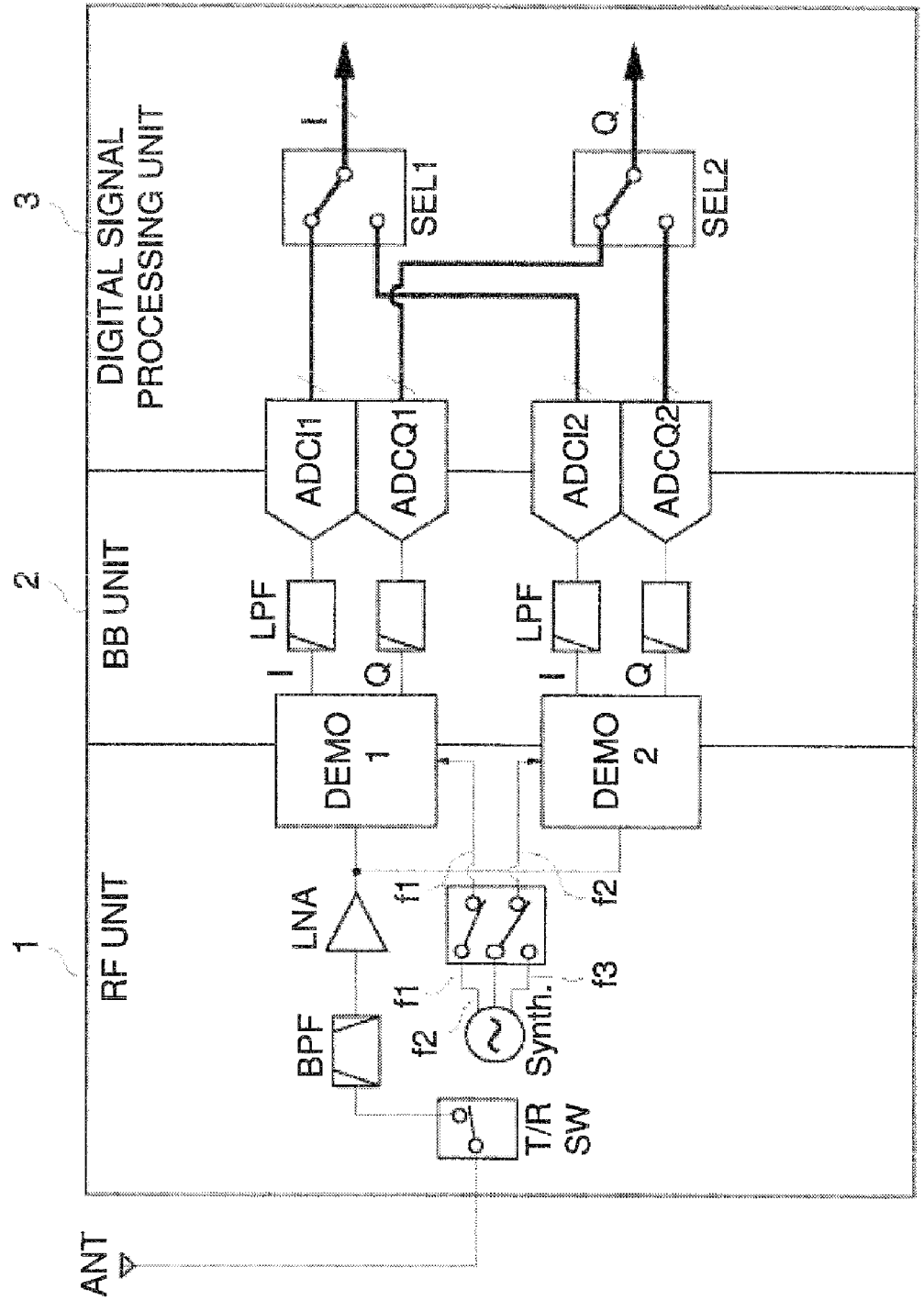
Figure 10C:
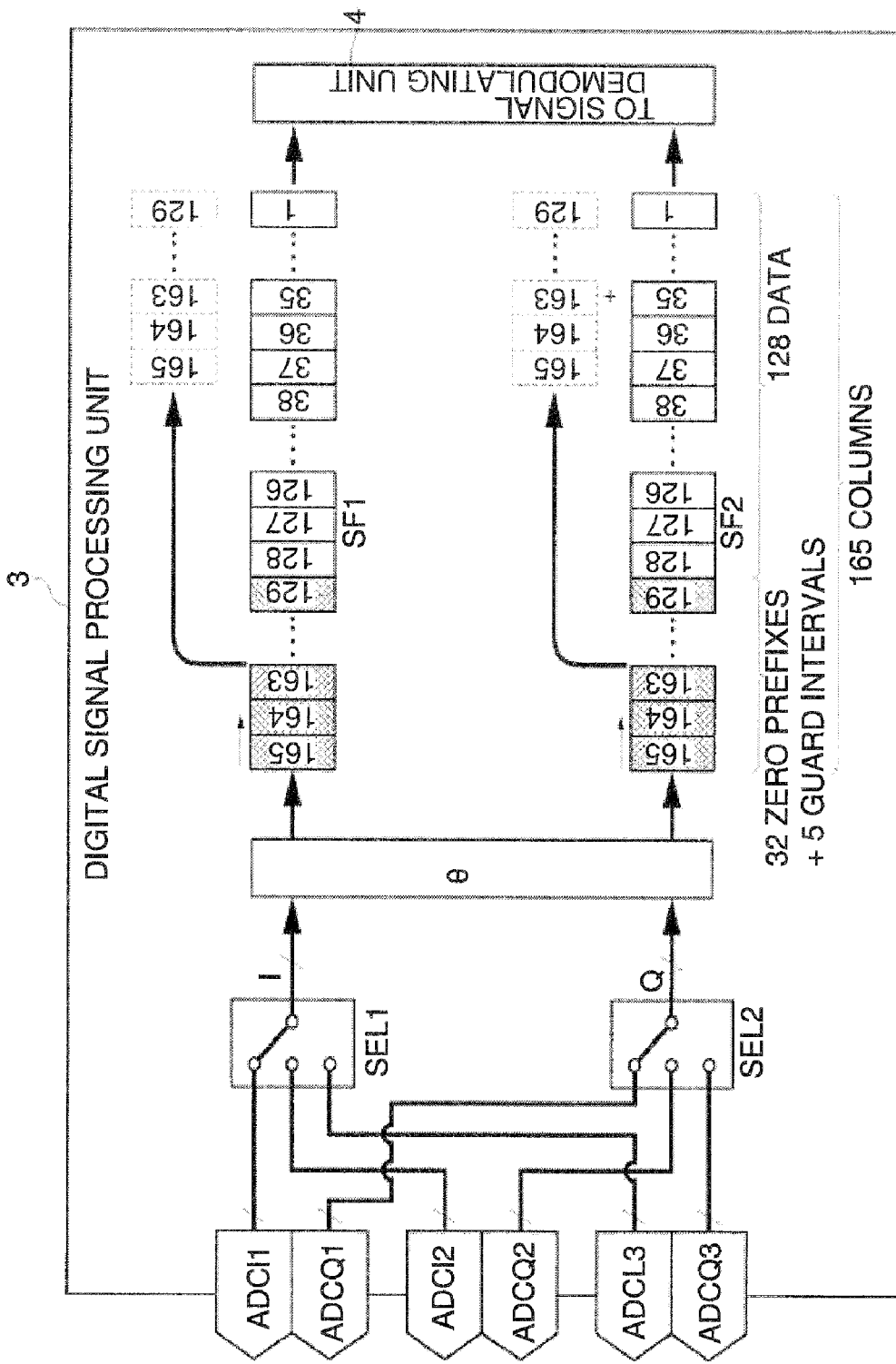
Figure 10D:
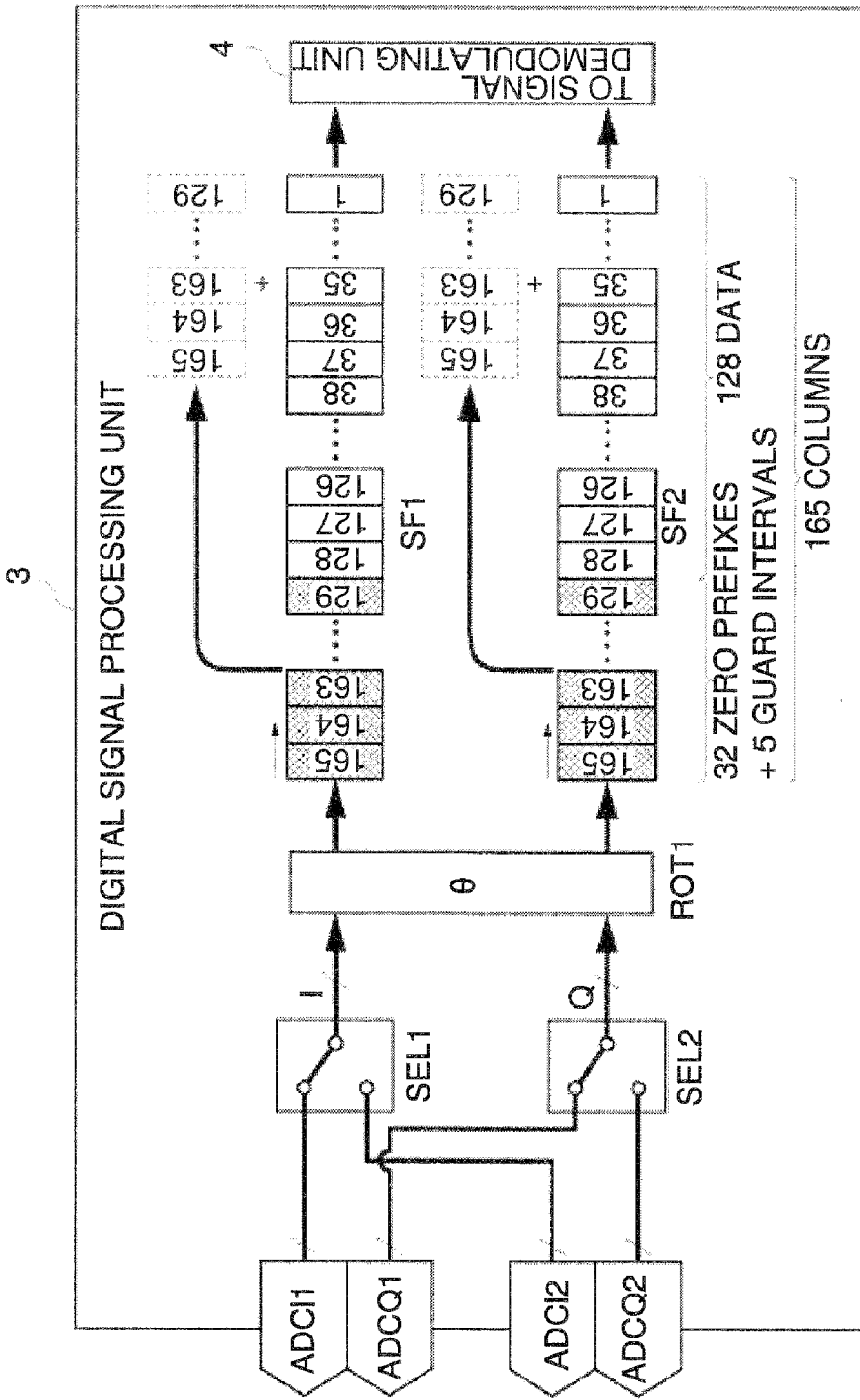
Figure 10E:
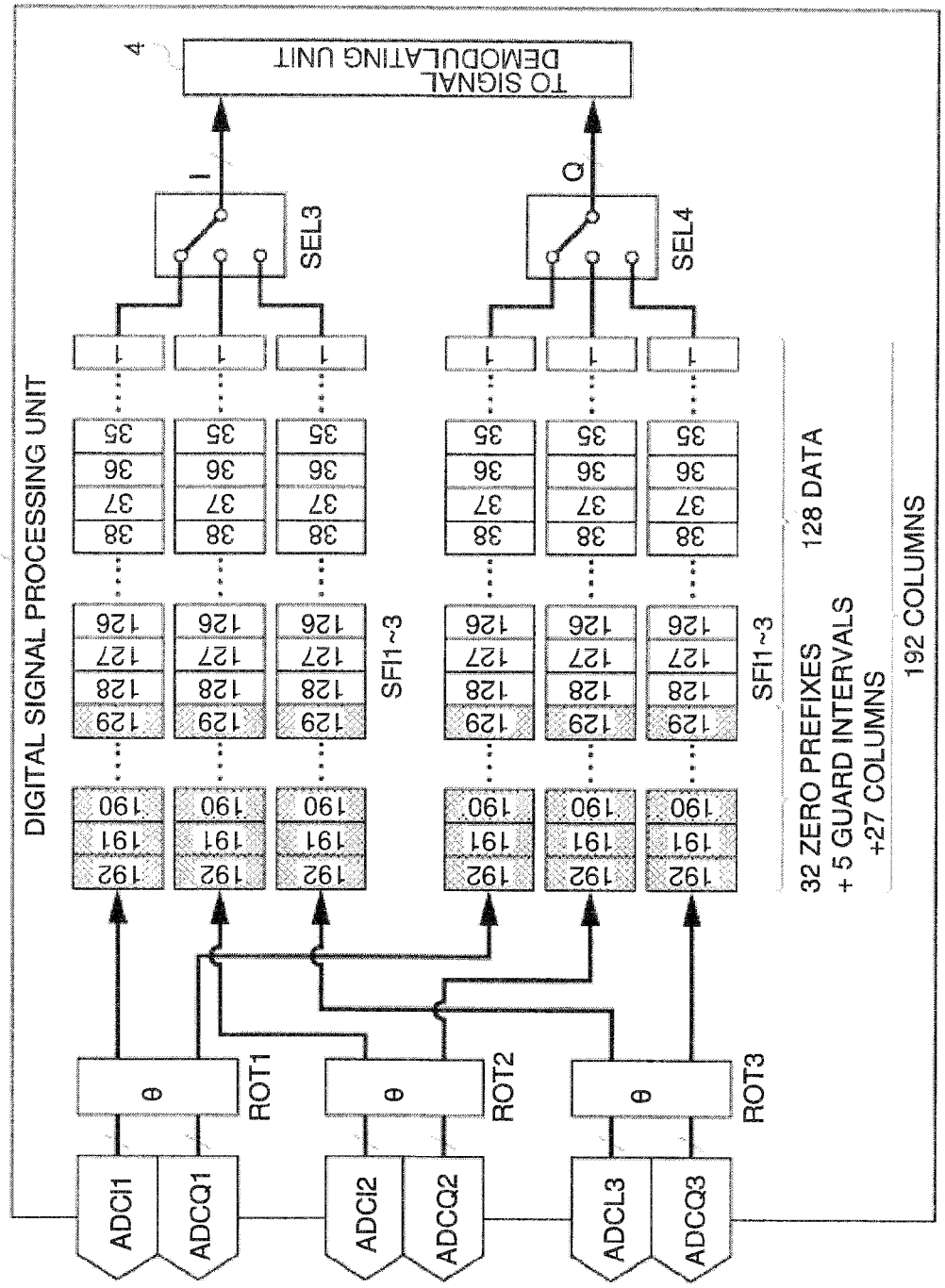
Figure 10F:
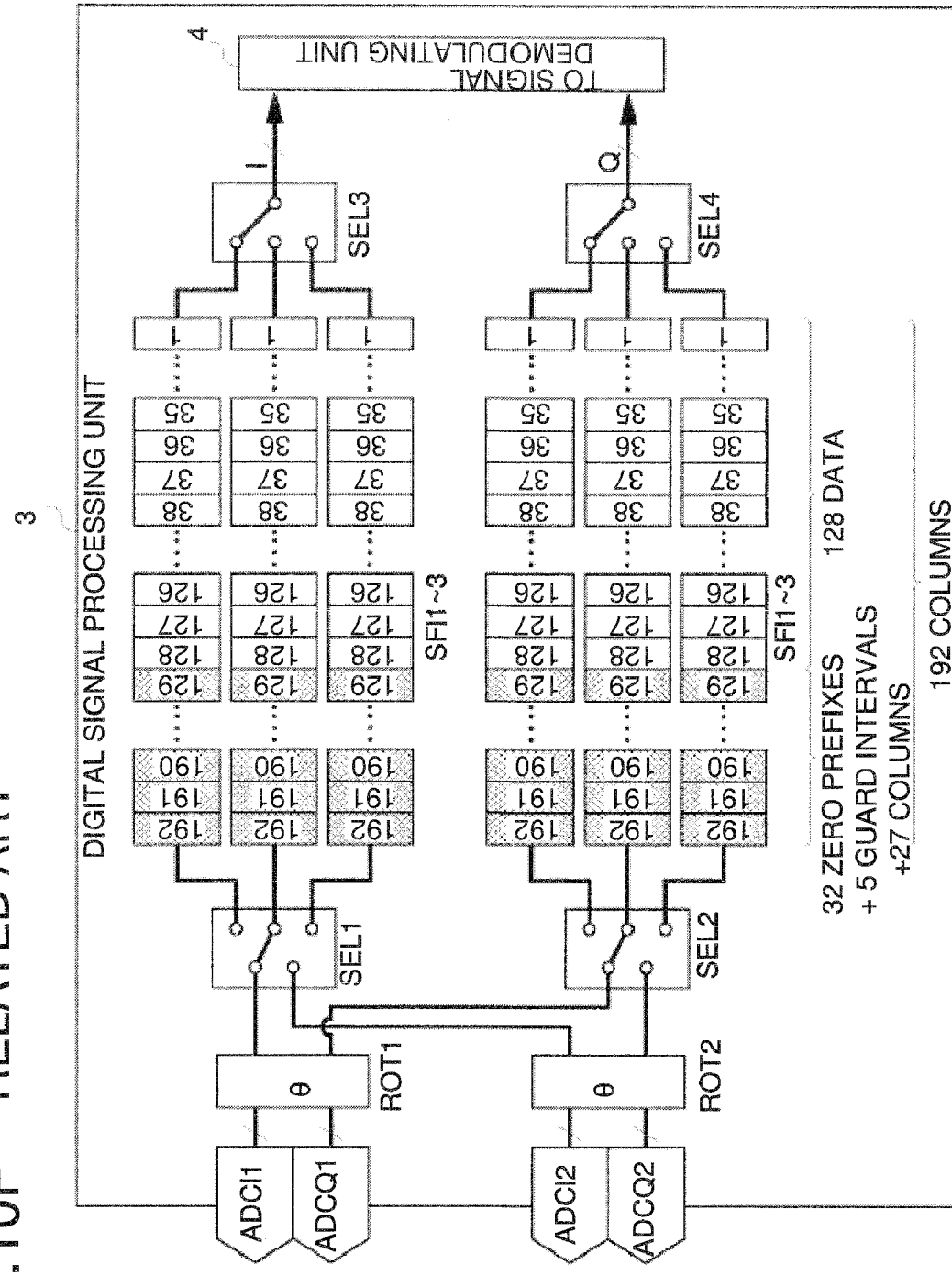

The principles of the present invention, contrast with related arts (Patent Documents) and specific exemplary embodiments will be described in the below.

A wireless communication apparatus according to the present invention (such as a Multi Band OFDM (Orthogonal Frequency Division Multiplexing) UWB (Ultra Wide Band) system compliant with a WiMedia standard, used as a PHY (physical layer) in Wireless USB, or the like) adopts a direct conversion receiving system, in which a packet is transmitted or received while performing frequency hopping for each symbol, and demodulation is started by performing carrier sensing at the beginning of the packet on the side of a receiver. The wireless communication apparatus is configured so that the LO (Local Oscillation) frequency in each of a plurality of receiving systems is fixed at each hopping frequency and each receiving system is brought into a ready state for reception. The number of the receiving systems conforms to the number of frequency hoppings. Then, by performing correlation detection at a preamble part at the beginning of the packet received through the frequency hopping, stable and fast carrier sensing and synchronization and start of the hopping on the receiver side are realized; and even AGC, AFC, synchronization establishment, and demodulating operation after the correlation detection (CCA: Clear Channel Assessment detection) are performed with frequencies of LOs in the receiving systems being fixed. A DC offset that is generated in a received baseband signal due to self-mixing, and DC offset jump that occurs immediately after the frequency hopping are thereby removed. The DC offset jump occurs due to insertion of a DC cut-off capacitance element CCut (which performs high-pass filtering of subcarriers more distant than a subcarrier in the most vicinity of a DC component based on Nulling of a DC signal at a time of OFDM) when a DC offset level differs for each frequency hopping. The DC cut-off capacitance element CCut is provided for preventing a DC signal increase in a stage after a baseband portion.

As described above, the DC offset and the DC offset jump may be a factor of fixed degradation of reception characteristics at a time of direct conversion reception involving frequency hopping. According to the present invention, the DC offset and the DC offset jump can be completely removed before an AD converter.

Frequencies of a plurality of the LOs in the receiving systems are not hopped for demodulation of a portion from the preamble to the header at the beginning of a packet in order to stably and reliably execute processing at the beginning of the packet. However, when a payload/data part is demodulated, a frequency of the LO in each receiving system arc hopped, thereby making a transition to a demodulating operation based on space division multiplexing using MIMO technology.

In the present invention, for demodulation of the payload/data part after demodulation of the portion from the preamble to the header at the beginning of the packet as well, the frequencies of the plurality of the LOs in the receiving systems may not be hopped, and one of the LO frequencies that is just the center of the LO frequencies in the receiving systems may be selected and set. When demodulation is performed with this frequency configuration, a demodulated symbol for which a transmission hopping frequency and the fixed frequency in the receiver are different appears as a Near-Zero baseband signal after an analog baseband portion. Thus, extraction on a frequency axis is performed by each complex bandpass filter provided in a digital baseband unit in a stage subsequent to the AD converter. Then, MIMO demodulation processing and space division multiplexing are performed. A DC offset that may be the factor of fixed degradation of the receiver at a time of direct conversion reception involving frequency hopping and DC offset jump that occurs immediately after the frequency hopping due to insertion of the DC cut-off capacitance element Ccut into the analog baseband portion can be completely removed. Together with completely removal of the DC offset and the DC offset jump, a demodulating operation based on space division multiplexing using the MIMO can be performed.

In Patent Document 1, the energy detection or auto-correlation detection at an RF frequency is performed when an RF signal is branched so as to achieve fast carrier sensing involving frequency hopping. Thus, RF detection for each frequency hopping is needed. An increase in the number of RF BPFs due to the RF detection, an increase in the circuit size due to a circuit configuration for detection at each RF frequency, an increase in the cost, and an increase in power consumption are thereby brought about. The configuration of the present invention is completely different from that of Patent Document 1. According to the present invention, the correlation detection and recognition of a hopping pattern timing can be performed in receiver digital baseband units in the receiving systems more simply and more reliably. Thus, an increase in each factor for the above-mentioned problems is not brought about.

In Patent Document 2, it needs a period equivalent to several OFDM symbols in order to make DC offset jump in an output of the DC cut-off capacitance element Ccut to converge. The convergence of the DC offset jump is determined by an RC time constant. The DC offset jump cannot be therefore immediately cancelled at the beginning of a received packet. In the present invention, a hopping symbol is simply and reliably extracted and demodulated at the digital baseband unit with the LO (Local Oscillation) frequencies in the plurality of receiving systems fixed. For this reason, the DC offset/DC offset jump can be completely removed from the beginning of the received packet. Receiving performance can be thereby obtained.

Patent Document 3, which aims at removal of DC offset jump in a baseband portion in a receiver in the Multi Band OFDM UWB system where frequency hopping is performed, discloses a configuration in FIG. 8. When the frequency hopping in the Multi Band OFDM UWB system is performed, degradation in reception characteristics due to the DC offset jump in the receiver is suppressed.

Patent Document 2 aims at improvement in various circuits based on the direct conversion receiving system.

Patent Document 3 aims at improvement in DC offset jump and others in a receiver after a transmitter-receiver PHY architecture and a main system configuration have been changed to a "Near-Zero IF system" and are then fixed. A transmission/reception PHY architecture and a main system configuration are different from those of the receiver of the present invention. A further difference between Patent Document 3 and the present invention is that, in the present invention, the LO frequencies after carrier sensing at the beginning of a packet are hopped.

In the invention in Patent Document 3, an LO frequency is set to just a center frequency (boundary frequency) of received hopping modulated waves, and the received modulated waves down-converted to an analog baseband are placed in a Near-Zero IF region that extends from 0 Hz in a minus frequency direction. With this frequency arrangement, a large frequency interval that is approximately 10 times that in the direct conversion system can be secured between the lowest end of frequencies of the Near-Zero IF modulated waves (lowest end subcarrier frequency) down-converted to the analog baseband in the receiver and 0 Hz.

According to the invention in Patent Document 3, the cut-off frequency of an HPF determined by a DC cut-off capacitance element Ccut inserted in the analog baseband portion, for cutting a DC offset, can be increased to approximately 10 times. Then, by the mechanism that is the same that described above, the time constant of the HPF is reduced to approximately ⅒ even if DC offset jump occurs.

According to the invention in Patent Document 3, the time-domain response of the DC offset jump can be compressed to the order of ⅒ (approximately 30 nsec) of the period of an OFDM symbol in the Multi Band OFDM UWB system. Then, after the transient response (approximately 30 nsec) has been kept within 70.1 nsec of zero padding segment+guard interval segment of an effective OFDM symbol, the DC offset jump can be removed in a digital baseband unit.

According to the invention in Patent Document 3, degradation in reception characteristic caused by the DC offset jump at a time of demodulation through the hopping can be minimized.

According to the invention in Patent Document 3, the sampling frequency of an AD converter is kept at a received modulated wave bandwidth, which is a half of two times the maximum modulated wave frequency bandwidth, and occurrence of frequency folding that is symmetrical with respect to 0 Hz (frequency holding (Folding)=folding at the AD converter) is utilized. The sampling frequency of the AD converter is not set to two times the maximum modulated wave frequency bandwidth in view of folding based on an ordinary sampling theorem (phenomenon in which frequency components that exceeds a Nyquist frequency are folded at a time of sampling).

In this case, positive and negative SSB (Single Side Bands) appear like a mirror image with respect to 0 Hz. Using this phenomenon, Patent Document 3 rearranges subcarriers after a FFT (Fast Fourier Transform) and downcoverts the subcarriers to the Zero-IF baseband.

According to the invention in Patent Document 3, with this frequency folding and subcarrier rearrangement, there is provided an advantage that the need for frequency shift using a 2nd LO signal in a digital baseband unit is eliminated.

However, before frequency folding in a plus side baseband frequency direction is performed by AD conversion, it is necessary to sufficiently suppress an image bandwidth (that is a plus side baseband frequency bandwidth where an adjacent receiver channel (Ch) interference wave and the like are present) for a received baseband wave that is present in the Near-Zero IF region which extends in a minus frequency direction from 0 Hz, in the analog baseband portion in advance, considering processing after frequency holding. It is necessary to sufficiently remove these adjacent receiver channel (Ch) interference wave and the like in this plus side baseband frequency bandwidth.

It is necessary to insert complex BPFs (Hilbert BPFs) capable of making distinction between positive and negative baseband frequencies and suppressing the positive and negative baseband frequencies into the analog baseband portion and then to execute demodulation processing.

According to the present invention, a receiver configuration that can also assume a MIMO configuration is proposed, together with an approach to avoid the problems described above. Improvement in performance and added value are thereby newly provided, while avoiding the problems described above.

A difference between configurations of Patent Document 5 and the present invention is as follows. In Patent Document 5, a switch a BPF (Bandpass Filter: bandpass filter), and an LNA (Low Noise Amplifier: low noise amplifier) before QDEM (quadrature demodulation) in a direct conversion system are implemented as one system and are shared by three subbands. In the present invention, in order to simultaneously allow performance expansion to MIMO space multiplexing, all antennas and LNAs that are circuit blocks in a stage before QDEM (quadrature demodulation) are implemented as complete three systems. In contrast to a SISO (Single Input Single Output) system, the present invention has an advantage that MIMO transmission/reception can be performed in the payload part following reliable and stable correlation detection at the preamble part. Thus, the present invention is different from the SISO system and effective in that a further increase in speed, capacity, and communication rate can be achieved by space multiplexing, or due to space multiplexing in transmission/reception at a low rate, reaching distance performance can be improved more greatly than transmission/reception at a same total rate using the SISO system.

According to the present invention, in the wireless communication apparatus that adopts the direct conversion receiving scheme in which a packet is transmitted or received while performing frequency hopping for each symbol and demodulation is started by performing carrier sensing at the beginning of the packet on the side of a receiver, the LO frequency in each of a plurality of receiving systems is set to be fixed at each hopping frequency. With this arrangement, fast carrier sensing in the digital baseband unit is performed using several symbols in the preamble part at the beginning of the packet received with frequency hopping, and the payload/data part is demodulated after an operation from hopping pattern detection to hopping synchronization in the receiver. The cutoff bandwidth of a variable-bandwidth LPF (for channel filtering) provided in the baseband portion in each receiving system is set to be narrow during processing on and demodulation of the portion from the preamble to the header.

Further, according to the present invention, even AGC (Auto Gain Control) AFC (Auto Frequency Control), synchronization establishment, and the demodulating operation after the CCA are performed with the frequencies of the LOs in the plurality of the receiving systems fixed. A DC offset and DC offset jump which may be the factor for degradation in loss in the receiver at the time of direction conversion reception involving frequency hopping are completely removed before the AD converter. The DC offset occurs in a received baseband signal due to self-mixing and so forth. The DC offset jump occurs immediately after the frequency hopping. The DC offset jump occurs due to the DC cut-off capacitance element CCut (which performs high-pass filtering of the sub-carriers more distant than the subcarrier in the most vicinity of the DC component based on DC Nulling at the time of OFDM) for preventing a DC signal increase in the stage after the baseband portion when the DC offset level differs for each frequency hopping.

In the present invention, for demodulation of the portion from the preamble to the header at the beginning of a packet, the frequencies of the plurality of LOs in the plural receiving systems arc not hopped in order to stably and reliably execute fast carrier sense determination and hopping synchronization at the beginning of the packet. However, when the payload/data part is demodulated, the frequency of the LO in each receiving system is hopped. The transition to the operation of space division multiplexing demodulation by MIMO can be thereby made. In this case, the cut-off bandwidth of each of the variable-bandwidth LPFs (channel filtering) provided in each receiving system baseband portion at each time of demodulation of the payload/data part after processing on the portion from the preamble to header part is set to be narrow.

In the present invention, for demodulation of the portion from the preamble to the header at the beginning of a packet, the frequencies of the plurality of the LOs in the plural receiving systems are not hopped in order to stably and reliably execute fast carrier sense determination and hopping synchronization at the beginning of the packet. Then, at a time of subsequent demodulation of the payload/data part as well, the frequencies of the plurality of the LOs in the receiving systems may not be hopped, and one of the LO frequencies that is just the center is selected from the LO frequencies in the receiving systems. Then, by applying the selected LO frequency to all the receiving system LOs to operate, the demodulating operation based on the MIMO space division multiplexing can be performed, while completely removing the DC offset and the DC offset jump. The DC offset jump occurs immediately after frequency hopping due to insertion of the Ccut into the analog baseband portion. The DC offset and the DC offset jump may be the factor for fixed degradation of reception at the time of direction conversion reception involving frequency hopping.

In the present invention, when the above-mentioned configuration is adopted to secure further reception characteristic improvement due to complete avoidance of DC offset jump in the receiver and to perform the MIMO demodulation, the LOs in the receiving systems are all fixed at one frequency in the vicinity of the center of the overall frequency bandwidth of the frequencies. Thus, when a symbol in a time zone for which a transmission hopping frequency is the one other than the LO frequency is demodulated, a Near Zero IF demodulation method is used. Then, by widening or narrowing the cut-off bandwidth of each of the variable-bandwidth LPFs (for channel filtering) included in the baseband portion in each receiving system, Near Zero IF baseband signals each of which is responsive to a difference between the transmission hopping frequency and the LO frequency can be sufficiently received after the AD converter. Further, by mounting complex bandpass filters and a digital frequency converter on the digital baseband unit after the AD converter, modulated symbols that have been dispersed in positive and negative baseband frequency directions can be extracted, integrated, and demodulated.

According to the present invention, when fast carrier sensing and hopping pattern detection are reliably implemented, the plurality of receiving systems, the number of which conforms to the number of frequency hoppings, are provided. Then the LO frequency of each of the receiving systems is set to be fixed at each hopping frequency and the LOs are brought into the ready state for reception. Correlation relation (CCA: Clear Channel Assessment) at the preamble part at the beginning of a received packet including an arbitrary frequency hopping pattern can be first performed by the receiving system having one of the LO frequencies, and a receiving operation can be thereby started. Further, the plurality of receiving systems, the number of which conforms to the number of frequency hoppings, provided in advance are all in a ready state for reception. Thus, whatever hopping pattern using a plurality of frequencies is employed, a correlation detection output is supplied from the receiving system having one of the LO frequencies. The deviation in these LO frequencies by which correlation, detection has been performed is tracked in the digital baseband unit. The hopping pattern can be thereby identified, using the minimum number of the hopping patterns. In the case of a three-band hopping mode including no hopping and two-band hopping, correlation detection/CCA and complete acknowledgement of the feature of the hopping pattern can be performed at a third one of symbols at the minimum. Fast and stable carrier sense operation and start of demodulation can be thereby performed.

Further, according to the present invention, with respect to complete removal of the DC offset jump that may be the factor for fixed degradation of reception at the time of direction conversion reception involving frequency hopping, even AGC, AFC, synchronization establishment, and the demodulating operation after the CCA are performed without frequency hopping faith the frequencies of the LOs in the plurality of the receiving systems fixed. Thus, even if different DC offsets have appeared in the analog baseband portions in the respective receiving systems, values of the DC offsets do not vary due to the frequency hopping. Amplification of the DC signal can be suppressed by each Ccut inserted into the analog baseband portion in a stable manner. Thus, the DC offset jump for each hopping can be eliminated.

Further, according to the present invention, stable and fast carrier sensing can be performed, and the DC offset jump can be suppressed.

In the present invention, the plurality of receiving systems that are completely separated and implemented corresponding to the number of hopping frequencies are employed. A factor capable of contributing to higher performance in the Payload part after demodulation of the portion from the preamble to the header is also included. Due to presence of the completely separated receiving systems in a region from antennas to the digital baseband unit of the receiver, space division multiplexing based on MIMO demodulation becomes possible. The present invention is effective in that the problems described above can be solved and a further increase in speed and capacity can be achieved. A description will be given below in connection with specific exemplary embodiments.

FIGS. 1A, 1B, 1C, 1D, and 1E are diagrams for explaining an exemplary embodiment of the present invention. FIG. 1A is a diagram explaining a wireless communication apparatus in the exemplary embodiment of the present invention. FIGS. 1B and 1E are diagrams respectively explaining a received baseband output in an off state of frequency hopping in a portion from a preamble part to a header part at the beginning of a received packet and correlation detection. FIG. 1C is a diagram illustrating the received baseband output in an on state of the frequency hopping in a payload part at the rear of the received packet (when MIMO reception is performed). FIG. 1D is a diagram illustrating a propagation path matrix.

Referring to FIG. 1A, symbol signal sequences for transmission involving WiMedia-compliant three-band frequency hopping are emitted from individual transmitters of transmitting antennas 1, 2, and 3. Alternatively, a transmission wave having a fixed one of hopping frequencies for each transmitter is emitted into the space.

As shown in FIG. 1A, the transmitting antenna 1 can perform radiation of three hopping waves Af1, Af2, and Af3 or only the hopping wave Af1 (transmission of the wave Af1 stop of transmission of the wave Af2, and stop of transmission of the wave Af3). The transmitting antenna 2 can perform radiation of three hopping waves Bf1, Bf2, and Bf3 or only the hopping wave Bf2 (stop of transmission of the wave Bf1, transmission of the wave Bf2, and stop of transmission of the wave Bf3). The transmitting antenna 3 can perform radiation of three hopping waves Cf1, Cf2 and Cf3 or only the hopping wave Cf3 (stop of transmission of the wave Cf1, stop of transmission of the wave Cf2, and transmission of the wave Cf3).

The number of the transmitting antennas can also be expanded to x n series (n being the same as the number of hopping frequencies).

The respective received waves that have been propagated through a total of 3×3 propagation paths from the transmitting antennas are received at receiving antennas 4, 5, and 6, the number of which is the same as the number of transmission hopping frequencies, on a receiver side. Receiver systems in a subsequent stage respectively includes low noise amplifiers 7, 8, and 9, orthogonal demodulation units (QDEMs) 10, 11, and 12, variable-bandwidth LPFs (channel filtering) 16, 17, 18, and variable-gain analog baseband amplifier 19, 20, and 21 that are independent to one another. When expanded, the number of the transmitting antennas is increased to m×n (in which m is the same as the number of receiver hopping frequencies). The receiving antennas can be expanded to x m series.

LOs (Local Oscillators) 13, 14, 15 capable of outputting three types of hopping frequencies are respectively connected to the QDEMs 10, 11, and 12.

The frequencies of the LOs 13, 14, and 15 are set to be fixed so that the LOs 13, 14, and 15 respectively output different three types of the LO frequencies according to each of operation modes (for an operation from preamble correlation detection to demodulation of a header part, MIMO mode in a payload/data demodulating section) which will be described later.

When a transition is made to the MIMO mode (refer to a description in a second exemplary embodiment in FIG. 5, which will be described later), the frequencies of the LOs 13, 14, and 15 are hopped in synchronization with the hopping cycle of the received waves. An AD converter (ADC) 22 is connected to subsequent analog baseband stages in the respective three receiving systems. After each demodulated symbol has been converted into a digital baseband, various necessary demodulation processing is performed in a digital region.

In the wireless communication apparatus that adopts a direct conversion receiving scheme (such as a Multi Band OFDM UWB system compliant with a WiMedia standard, used as a PHY (physical layer) in Wireless USB), where a packet is transmitted or received while performing frequency hopping for each symbol and demodulation on a receiver side is started by performing carrier sensing at the beginning of the packet, a plurality of receiving systems are provided. The number of the receiving systems conforms to the number of frequency hoppings (three receiving systems a, b, and c being assumed for three frequency hoppings in FIG. 1). Each receiving system is brought in a ready state for reception, with the LO frequencies of the receiving systems a, b, c set to be fixed at hopping frequencies f1, f2, and f3, respectively.

This wireless communication apparatus has a function in which correlation detection (CCA: clear channel assessment detection) even at a preamble part at the beginning of a received packet including an arbitrary frequency hopping pattern can be first performed at the receiving system having one of the LO frequencies, and a reception operation can be thereby started.

Further, the plurality of receiving systems, the number of which conforms to the number of the frequency hoppings, are all in a ready (Ready) state for reception, in advance. Thus, when the Multi Band OFDM UWB system compliant with the WiMedia standard is taken as an example, whatever hopping pattern using the three frequencies including no frequency hopping or two-band hopping is employed, a correlation detection output is output from the receiving system having one of the LO frequencies one after one. Then, variations in these LO frequencies, by which correlation detection has been made, are tracked in a digital baseband unit. The hopping pattern can be thereby identified, using the minimum number of hopping symbols.

In the case of a three-band hopping mode involving no frequency hopping and two-hand hopping, for example, correlation detection/CCA and complete recognition of the feature of the hopping pattern can be performed at a third one of symbols at the minimum. Fast and stable carrier sense operation and start of demodulation can be thereby performed. That is, in the case of the three-band hopping mode involving no frequency hopping and two-band hopping, when hopping frequencies are indicated by f1, f2, and f3, determination of f1/f2/f3, f1/f2/f1/f2, or the like, determination of f1/f3/f2, f1/f3/f1/f3, or the like, or determination of f1/f1/f1, f1/f1/f2/f2/f3/f3, or the like can be made at the third one of the symbols at the minimum.

A plurality of the frequencies of the receiving system LOs 13, 14, and 15 are not hopped for demodulation of a portion from the preamble to the header at the beginning of each packet in order to stably and reliably perform fast carrier sense determination and hopping synchronization at the beginning of the packet. As settings of frequency hopping and a transition of symbols to be sent out from the respective transmitting antenna 1, 2, and 3 and the transmitting systems for the portion from the preamble to the header at the beginning of the packet in that case, the following two types (A) and (B) which do not use multiplexing may be employed, according to presence or absence of the hopping on a transmitter side (refer to FIGS. 2A and 2B). FIGS. 2A and 2C respectively illustrate relationships between the transmitting antennas (×3) and the receiving antennas (×3), when the frequencies of the receiving, system LOs 13, 14, and 15S are not hopped and a propagation path matrix for the transmission and receiving antennas. FIGS. 2B and 2D respectively illustrate relationships between the transmitting antennas (×3) and the receiving antennas (×3), when the frequencies of the receiving system LOs 13, 14, and 15 are hopped and a propagation path matrix for the transmission and receiving antennas.

By sending out the portion from the preamble to the header using one of the (A) and (B) transmission modes, received symbols af1, bf2, and cf3 corresponding to a hopping symbol transition in Af1, Bf2, and Cf3 transmissions and a hopping symbol transition in Af1, Af2, and Af3 transmissions can be received in the receiving systems a, b, and c.

For each symbol slot, reference characters Af* indicates sending from the transmitting antenna 1, reference characters Bf* indicates sending from the transmitting antenna 2, and Cf* indicates sending from the transmitting antenna 3. f* indicates the hopping frequency.
(A) mode without frequency hopping for the portion from the preamble to header on the transmission side (where pseudo transmission frequency hopping is executed with the LO for transmission A being fixed at f1, LO for transmission B being fixed at f2, and LO for transmission C being fixed at f3 in three separate transmissions):
first symbol slot: Af1 transmission, stop of Bf1 transmission, and stop of (Cf1 transmission;
second symbol slot: stop of Af2 transmission, Bf2 transmission, and stop of Cf2 transmission; and
third symbol slot: stop of Af3 transmission, stop of Bf3 transmission, and Cf3 transmission . . . .
(B) frequency hopping mode for the portion from the preamble to header on the transmission side (where frequency hopping is executed using only one of the three transmissions, which is transmission A)
first symbol slot: Af1 transmission, stop of Bf1 transmission, and stop of Cf1 transmission;
second symbol slot: Af2 transmission, stop of Bf2 transmission, and stop of Cf2 transmission,
third symbol slot: Af3 transmission, stop of Bf3 transmission, and stop of Cf3 transmission . . . .

Similarly, after hopping synchronization could be obtained on the receiver side, a portion from the header to the payload of the packet in each receiving system can be demodulated, with the frequencies of the LOs fixed.

In the receiver in this exemplary embodiment, only a subband of a received symbol that appears in a region from the analog baseband portion to the digital baseband unit through the AD converter in the receiving system appears on a baseband time axis at a Zero-IF frequency. The subband has a center frequency which is the fixed frequency of the LO set for each receiving system. By performing temporal rearrangement of these received symbols that appears at the receiving systems for the respective hopping frequencies on the digital baseband unit after AD conversion, quasi-synchronous detection can be performed as if direct conversion reception involving frequency hopping has been performed in the receiving systems.

As an effect obtained in this case, a DC offset generated in a received baseband signal due to self-mixing or the like, which may bring about fixed degradation at a time of direct conversion reception involving frequency hopping is brought into a static and stable state. Then, due to a Ccut inserted into the analog baseband portion in each receiving system, an increase in a DC signal and transmission of the DC signal to a subsequent stage can be prevented.

Further, when an analog baseband gain is adjusted by AGC for each frequency hopping at a time of conventional direction conversion applied to a single baseband, there is the following problem. That is, a step-like DC offset difference is generated in an input to the Ccut when a DC offset differs for each frequency hopping, and then, a transient response or DC offset jump occurs in an output of the Ccut.

Assume that a portion from the beginning of a packet to the header of the packet is received by the plurality of receiving systems, in each which the frequency of the LO is fixed at each hopping frequency, as in this exemplary embodiment. Then, as described above, no DC offset jump occurs, and only a static DC offset that appears in each analog baseband portion is completely removed by the Ccut in a stage before the AD converter.

Assume that the LO frequency is fixed for a portion from the preamble to the header, part and the portion from the header to the payload part and frequency hopping on the receiver is pseudo captured in this exemplary embodiment. Then, the cut-off bandwidth of each of the variable-bandwidth LPFs 16, 17, and 18 (channel filtering) provided in the baseband portion of the receiving system during processing and demodulation is set to be narrow enough for passing a baseband frequency width per subband. This setting is made so that an interference wave from an adjacent receiver channel, various unwanted interference waves, and a blocking wave may be removed as much as possible. The interference wave is received at a time of a hopping frequency other than that for the channel of each receiving system.

In this exemplary embodiment, the frequencies of a plurality of the receiving system LOs 13, 14, and 15 are not hopped for demodulation of the portion from the preamble to the header at the beginning of a packet in order to stably and reliably perform fast carrier sense determination and hopping synchronization at the beginning of the packet. However, when the payload part or data is demodulated, the frequency of each of the receiving system LOs 13, 14, and 15 is hopped. Then, the following third feature is obtained.

In the analog and digital baseband units after the QDEMs 10, 11, and 12 in the respective receiving systems, receiving system symbol groups appear in a time series in the form of af1, bf1, cf1-->aff2, cf2-->af3, bf3, cf3, and the like, respectively corresponding to transitions of time-series symbols with the hopping patterns and the hopping frequencies on the side of the respective transmitters of Af1, Bf1,Cf1-->Af2, Bf2,Cf2-->Af3, Bf3, Cf3. These symbols are subject to MIMO demodulation processing (which will be described later). A transition to space division multiplexing can be thereby made.

When the transition to the space division multiplexing is made, the cut-off bandwidth of each of the variable-bandwidth LPFs 16, 17, and 18 (channel filtering) provided in each baseband portion of the receiving system at a time of demodulation of the payload part/data subsequent to processing on the portion from the preamble to the header part is set to be narrow enough for passing the baseband frequency width per subband. This arrangement is made so that an interference wave from an adjacent receiver channel received at a time of a hopping frequency other than that for the channel of each receiving system, various unwanted interference waves, and a blocking wave may be removed as much as possible.

In the exemplary embodiment about MIMO technology, when the payload part/data is demodulated in a different mode (refer to FIG. 5 about a second exemplary embodiment which will be described later), a plurality of the receiving system LOs 13, 14, and 15 are operated without hopping for demodulation of the portion from the preamble to the header at the beginning of a packet, in order to stably and reliably perform fast carrier sense determination and hopping synchronization at the beginning of the packet. Then, at a time of demodulation of the payload part or data as well, the plurality of the receiving system LOs 13, 14, and 15 are operated without hopping. One of the frequencies of the receiving system LOs 13, 14, and 15 or the frequency of the LO 14, which is just the center of the frequencies, is selected. Then, all the receiving system LOs 13, 14, and 15 are operated at the frequency of the LO 14.

In this exemplary embodiment, the DC offset that may be the factor of fixed degradation of receiving characteristics at a time of direct conversion reception involving frequency hopping and the DC offset jump immediately after the frequency hopping, which occurs by insertion of the DC cut-off capacitance element Ccut into the analog baseband portion can be completely removed over an entire length of a packet. Together with this removal a demodulating operation based on space division multiplexing using the MIMO can be performed.

Next, in order to describe an operation of this exemplary embodiment shown its FIG. 1 in further detail, a relationship among the following items after correlation detection of the portion from the preamble to the header at the beginning of a received packet and when a transition to MIMO demodulation is made at the payload or data part is shown in each of FIGS. 3 and 4.

a time-variant transition of demodulated symbols that appear in the digital baseband unit after the AD converter 22 in each receiving system;

a propagation path matrix H between the transmitter and the receiver, associated with n×m MIMO operations (3×3 MIMO operations being herein assumed) and a matrix of the demodulated symbols that appear in each of the three receiving systems obtained by multiplication by a transmission matrix that indicates the three transmission systems (time-variant transition of the demodulated symbols that appear in the digital baseband unit after the AD converter 22).

FIG. 3A illustrates inputs to the ADC. FIGS. 3B and 3C respectively illustrate a baseband output series (symbols in each slot) of the portion from the preamble to the header at the beginning of a received packet and the payload part at the rear of the received packet when frequency hopping is not performed. FIGS. 3B and 3C correspond to FIG. 2A. FIGS. 3F, 3E, and 3D show relationships of received signal sequence vectors each obtained by an operation between the propagation path matrix and a transmitted signal sequence vector when the frequencies of the receiving system LOs are fixed at f1, f2, and f3) (respectively corresponding to reception of the symbols af1, bf2, and cf3 in respective symbol slots in FIG. 3B). FIGS. 3I, 3H, and 3G show relationships of received signal vectors each obtained by an operation between the propagation path matrix and a transmitted signal sequence vector when the frequencies of the receiving system LOs are hopped (respectively corresponding to reception of the symbols (af1, bf1, cf1), (af2, bf2, cf2), and (af3, bf3), cf3) in respective symbol slots in FIG. 3C). FIGS. 4D to 4F correspond to the case (in FIG. 2B) where frequency bopping is present on the transmission side in FIG. 3.

Also for a portion after correlation detection at the portion from the preamble to the header part of the received packet, and the payload or data part when the frequency of each of the receiver LOs 13, 14, and 15 is fixed, matrix expressions indicating transmission and receive operations are shown on the left side of FIGS. 3 and 4.

As an expression about transmission/reception matrix expressions including propagation path characteristics (assuming the matrix H and n×m transmitting/receiving MIMO operations, herein 3×3 MIMO operations being assumed) on the receiver side, only the symbols af1, bf2, and cf3 are sequentially extracted as received waves that appear in the baseband portions in the receiving systems through the channels of the LO frequencies fixed for the respective receiving systems a, b, and c. The symbols appear in such a way because, at a time of demodulation of each symbol, the frequencies of the LOs 13, 14, and 15 in the receiving systems a, b, and c are fixed, and the bandwidth of each of the variable-bandwidth LPFs 16, 17, and 18 (for channel filtering) provided in the respective receiving system baseband portions shown in FIG. 1 is set to a narrow bandwidth appropriate for the frequency bandwidth of the channel (Ch) per hopping. After the AD converter, carrier sensing is performed by a correlation detector. Then, the portion after the header is demodulated by a 16 QAM (Quadrature Amplitude Modulation)/QPSK (Quadrature Phase Shift Keying) demodulator.

As described above, the frequencies of a plurality of the receiving system LOs 13, 14, and 15 are not hopped for demodulation of the portion from the preamble to the header at the beginning of a packet in order to stably, and reliably perform fast carrier sense determination and hopping synchronization at the beginning of the packet. As settings of frequency hopping and the transition of the symbols to be sent out from the respective transmitting antenna 1, 2, and 3 and the transmitting systems for the portion from the preamble to the header at the be ginning of the packet in that case, the following two types (A) and (B) which do not use multiplexing may be employed, according to presence or absence of the hopping on the transmission side (refer to FIGS. 2A and 2B as well). A description will be given about transmission/reception matrix expressions in each of the (A) and (B) modes. Then, a description will be given about appearance of the received symbols af1, bf2, and cf3 at the receiving systems a, b, and c in either mode in a time-series and fixed manner (in which only the symbol aft appears at the receiver a system, only the symbol bf2 appears at the receiver b system, and only the symbol cf3 appears at the receiver c system).

(A) Mode for the portion from the preamble to the header on the transmission side:

The received symbols that appear at the respective receiving systems a, b and c determined by the transmission/reception matrix expressions in the case of the mode without frequency hopping are the symbols af1, bf2, and cf3, as shown in FIG. 3B.

The frequency of the LO for the transmission A of the three separate transmissions is fixed at the frequency f1. The frequency of the LO for the transmission B is fixed at the frequency f2, and the frequency of the LO for the transmission C is fixed at the frequency f3. Pseudo transmission frequency hopping is executed.

As shown in FIG. 2A, in the first symbol slot on the transmission side, Aft transmission, stop of Bf1 transmission, and stop of Cf1 transmission are performed. In the second symbol slot, stop of Af2 transmission, Bf2 transmission, and stop of Cf2 transmission are performed. In the third symbol slot, stop of Af3 transmission, stop of Bf3 transmission, and Cf3 transmission are performed.

As shown in FIGS. 3A to 3I, in the first slot on the receiver side, the symbol aft appears at the receiving system a, because the LO 13 in the receiving system a is fixed at the frequency f1. The received symbol af1=h11×Af1 appears at the receiving system a. The symbol bf1 cannot be received because the LO 14 in the receiving system b is fixed at the frequency f2. The symbol cf1 cannot be received because the LO 15 in the receiving system c is fixed at the frequency f3.

In the second symbol slot, the symbol af2 cannot be received because the LO 13 is fixed at the frequency f1. The symbol bf2 appears at the receiving system b because the LO 14 in the receiving system b is fixed at the frequency f2. The received symbol bf2=h22×Bf2 appears at the receiving system b. The symbol cf2 cannot be received because the LO 15 of the receiving system c is fixed at the frequency f3.

In the third symbol slot, the symbol Af3 cannot be received since the LO 13 in the receiving system a is fixed at the frequency f12. The symbol Bf3 cannot be received because the LO 14 of the receiving system b is fixed at the frequency f2. The symbol Cf3 appears at the receiving system c because the LO 15 of the receiving system c is fixed at the frequency f3. The received symbol cf3=h33×Cf3 appears at the receiving system c.

(B) Mode for the portion from the preamble to the header on the transmission side The received symbols that appear at the respective receiving systems a, b, and c determined by the transmission reception matrix expressions, in the case of the frequency hopping mode will be described (refer to FIG. 2B).

Assume that frequency hopping is executed using only one of the three separate transmission and the transmission A is used in the following example. On the transmission side, as shown in FIG. 2B, Af1 transmission, stop of Bf1 transmission, and stop of Cf1 transmission are performed in the first symbol slot. In the second symbol slot, Af2 transmission, stop of Bf2 transmission, and stop of Cf2 transmission are performed. In the third symbol slot, Af3 transmission, stop of Bf3 transmission, and stop of Cf3 transmission are performed.

On the receiver side, as shown in FIG. 4, the symbol af1 appears at the receiving system a because the LO (Local Oscillator) 13 its the receiving system a is fixed at the frequency f1. Then, the received symbol af1=h11×Af1 appears at the receiving system a. The symbol bf1 cannot be received because the LO 14 of the receiving system b is fixed at the frequency f2. The symbol cf1 cannot be received because the LO 15 in the receiving system c is fixed at the frequency f3.

In the second symbol slot, the symbol af2 cannot be received because the LO 13 in the receiving system a is fixed at the frequency f1. The symbol bf2 appears at the receiving system b because the LO 14 in the receiving system b is fixed at the frequency f2. Then, the received symbol bf2=h21×Af2 appears at the receiving system b. Since the LO 15 in the receiving system c is fixed at the frequency f3, the symbol cf2 cannot be received.

In the third symbol slot, the symbol Af3 cannot be received because the LO 13 in the receiving system a is fixed at the frequency f1. The symbol Bf3 cannot be received because the LO 14 in the receiving system b is fixed at the frequency f2. The symbol Cf3 appears at the receiving system c because the LO 15 in the receiving system c is fixed at the frequency f3. Then, the received symbol Cf3=h31×Af3 appears at the receiving system c.

Further, for demodulation of the portion from the preamble to the header at the beginning of a packet, the frequencies of the plurality of the LOs 13, 14, and 35 in the respective receiving systems are not hopped in order to stably and reliably execute processing at the beginning of the packet. When the payload/data part is demodulated, the frequencies of the respective LOs 13, 14, and 15 in the respective receiving systems are hopped. Then, a transition to the demodulating operation based on the MIMO space division multiplexing is made. A desired error rate can be achieved by a further increase in an overall transmission rate, speeding-up, and a low required C/N ratio. Low-rate transmission/reception is performed in the form of a plurality of streams in a large bundle, thereby aiming at improvement in a reaching distance characteristic. Further, using stream division processing based on singular value decomposition from the propagation matrix, importance is attached to improvement in accommodation capability in a cell. Expansion to multi-user MIMO-SDM (space division multiplexing) thereby also becomes possible.

When the MIMO mode is applied, transmission symbol wave sequences involving WiMedia-compliant three-band hopping must be emitted into the space from each of the transmitters of the transmitting antennas 1, 2, and 3.

The three hopping waves Af1, Af2, and Af3 are emitted from the transmitting antenna 1 (for transmission A). The three hopping waves Bf1, Bf2, and Bf3 are emitted from the transmitting antenna 2 (for transmission B). The three hopping waves Cf1, Cf2, and Cf3 are emitted from the transmitting antenna 3 (for transmission C).

Matrix that expresses transmission and receive operations when the frequencies of the LOs 13, 14, and 15 in the respective receiving systems are hopped using hopping patterns and times already recognized and determined in the preamble parts will be shown on the right side of FIGS. 3 and 4 (in which matrix operation expressions (G), (H), and (I) show the same operation as that in a portion indicated by reference character (C)). The frequency hopping is performed after the carrier sensing at the preamble part and the establishment of the hopping cycle and hopping synchronization by demodulation (DEMO) (with the frequencies of the respective receiving system LOs fixed).

According to these matrix expressions, as an expression about the transmission/reception matrix expressions including the propagation path characteristics (assuming the matrix H and n×m transmitting/receiving MIMO operations, herein 3×3 MIMO operations being assumed) on the reception side, the received waves appear in the baseband portions in the respective receiving systems as the symbols of af1/bf1/cf1, af2/bf2/cf2, af3/bf3/cf3, and the like, while being space multiplexed. The propagation path characteristics for 3×3 propagation streams that are different between the transmission and receive antennas for the respective receiving systems are multiplied and blended into three transmission waves. Each of the bandwidths of the variable-bandwidth LPFs 16, 17, and 18 (for channel filtering) is set to be a narrow bandwidth adequate for the channel frequency bandwidth of the channel per hopping.

Inverse matrix multiplication based on MIMO demodulation processing is performed on three types of multiplexed signals for each symbol. Streams (Af1/Bf/Cf1-->Af2/Bf2/Cf2-->Af3/Bf3/Cf3) on the transmission side are thereby reproduced. Then, multiplexing and combining process is performed in view of a transmission capacity.

The bopping frequencies (f1, f2, and f3) of the three transmission systems are synchronized among the three transmissions (A, B, C). In each of same frequency symbols Af*, Bf*, and Cf* among the three types of transmitted symbols Af1/Bf1/Cf1, Af2/Bf2/Cf2, Af3/Bf3/Cf3, information or data that are different though having the same frequency can be stored, using MIMO space division multiplexing.

For this reason, this exemplary embodiment may achieve approximately three times the capacity and speed of a related art that uses SISO technology. In the Multi Band OFDM UWB system established by the WiMedia standard, an information rate (Rate) at a time of the SISO is 53.3 Mbps to 480 Mbps. Thus, by using 3×3 MIMO operations of the present invention, an information rate of 160 Mbps to 1.44 Gbps, which is three times the information rate at the time of the SISO, can be realized.

As other example of MIMO demodulation, the MIMO demodulation where frequency hopping is performed with the frequencies of the respective LOs 13, 14, and 15 in the receiving systems being fixed may also be performed.

FIG. 5 is a diagram showing a configuration of a second exemplary embodiment of the present invention. FIG. 5A is a diagram that explains a wireless communication apparatus according to the exemplary embodiment of the present invention. FIG. 5B is a diagram illustrating a matrix of 3×3 propagation paths. FIG. 5C is a diagram showing output signals of an ADC in respective receiving systems in a frequency domain. FIG. 5D is a diagram showing output signals of digital baseband complex bandpass filters in the respective receiving systems in the frequency region. FIG. 5E is a diagram showing output signals of a digital frequency converter in the respective receiving systems.

In this exemplary embodiment, a further reception characteristic improvement by avoidance of DC offset jump in a receiver together with an effect of MIMO demodulation can be achieved. When such a setting is made, LOs 13, 14, and 15 in receiving systems are all fixed at one frequency (such as a frequency f2). Thus, the frequency of a received signal that appears in a baseband portion in each receiving system subsequent to each of QDEMs 10, 11, and 12 is near zero IF (Near Zero IF), when an LO frequency in the receiving system is other than the hopping frequency in the receiver.

The bandwidth of each of variable-bandwidth LPFs 16, 17, and 18 (for channel filtering) included in the baseband portion in each receiving system shown in the configuration in FIG. 5 is widened or narrowed so that low-pass filter cutting-off equal to or larger than three times (1.5 times of an RF channel bandwidth) a zero IF (Zero-IF) baseband channel bandwidth at a time of direct conversion reception is achieved. Near Zero IF signals, each of which is responsive to a difference between an RF frequency and the LO frequency (fixed at the frequency f2 for all the LOs) at a time of hopping in the receiver, can be sufficiently received after an AD converter 22. The MIMO demodulation thereby becomes possible.

When a MIMO mode is applied, symbol wave sequences for transmission involving WiMedia-compliant three-band hopping must be emitted into the space from individual transmitters of transmitting antennas 1, 2, and 3, as in the MIMO mode in the first exemplary embodiment (where hopping in the receiver is present).

That is, three hopping waves Af1, Af2, and Af3 are emitted from the transmitting antenna 1. Three hopping waves Bf1, Bf2, and Bf3 are emitted from the transmitting antenna 2. Three hopping waves Cf1, Cf2, and Cf3 are emitted from the transmitting antenna 3.

When the above-mentioned configuration is adopted to secure further reception characteristic improvement due to avoidance of DC offset jump in the receiver and perform the MIMO demodulation, each of the LOs 13, and 14, and 15 in the receiving systems is fixed at one frequency (frequency of the LO 14) in the vicinity of the center of the overall bandwidth of the frequencies. For this reason, when a symbol in a time zone for which a transmitter hopping frequency is the one other than the frequency of the LO 14 is demodulated, a Near Zero IF demodulation method is used. The cut-off bandwidth of each of the variable-bandwidth LPFs 16, 17, and 18 (for channel filtering) included in the baseband portion in each receiving system is widened or narrowed. The Near Zero IF baseband signals each of which is responsive to the difference between the transmitter bopping frequency and the frequency of the LO 14 can be thereby sufficiently received after the AD converter 22.

At the AD converter 22, in order to prevent aliasing (frequency folding) after AD conversion, quantization is performed at a sampling frequency comparable to twice the outermost frequency of the Near-Zero IF signal that appears in an analog baseband portion, or a sampling frequency that is six times a baseband channel bandwidth at a time of direct conversion reception.

In the case of a system where a 528 MHz subband is frequency hopped with three frequencies, for example, the sampling frequency is 1584 MHz, which is six times the baseband channel bandwidth of 264 MHz, or twice the outermost frequency of 792 MHz.

Further, by mounting complex bandpass filters 23 on a digital baseband unit after the AD converter 22, modulated symbols corresponding to positive, negative, and baseband frequencies are extracted. Then, finally, a digital frequency converter 24 is inserted into a stage after the extraction to apply frequency de-rotation to digital baseband signals as positive, negative, and Zero baseband signals (in which the positive digital baseband signal is de-rotated by −528 MHz, the negative digital baseband signal is de-rotated by +528 MHz, and no frequency shift is applied to the Zero-IF digital baseband signal). Signals received with frequency hopping in the respective receiving systems can be all transferred to a Zero-IF baseband frequency band. The MIMO demodulation in a subsequent stage thereby becomes possible.

Assume that an MIMO mode operation in this exemplary embodiment is indicated by signs (such as Af* and af*) that show LO frequencies, and symbols separately. Then, in the analog and digital baseband units after the QDEMs 10, 11, and 12, the following time-variant transitions of symbols having hopping patterns and frequencies on a transmitter side that are the same as in the first exemplary embodiment appear:

Af1/Bf1/Cf1-->Af2/Bf2/Cf2-->Af3/Bf3/Cf3-->, and so on. As symbols in the receiving systems, the following time series of received baseband symbols appear:

(1) symbols (as shown in a baseband frequency spectrum 1 in a lower portion of FIG. 1) down-converted to a baseband frequency band shifted on a minus side just by a frequency of $-(f2-f1)$ as a result of reception of a symbol af1 at the frequency f2, reception of a symbol bf1 at the frequency f2, and reception of a symbol cf1 at the frequency f2;

(2) symbols down-converted to a 0 Hz baseband (as shown in a baseband frequency spectrum 2 in the lower portion of FIG. 5) as a result of reception of a symbol af2 at the frequency f2, reception of a symbol bf2 at the frequency f2, and reception of a symbol cf2 at the frequency f2;

(3) symbols (as shown in a baseband frequency spectrum 3 in the lower portion of FIG. 1) down-converted to a baseband frequency band shifted on a plus side by a frequency of $+(f3-f2)$ as a result of reception of a symbol af3 at the frequency f2, reception of a symbol bf3 at the frequency f2, and reception of a symbol cf3 at the frequency f2;

AD conversion of the symbols ((1) and (3)) which appear as Near-Zero baseband signals due to a difference between transmission and reception frequencies and AD conversion of the symbols (2) for which the transmission and reception frequencies are the same as the frequency f2 are performed by the AD converter 22. The AD converter 22 performs quantization at the sampling frequency comparable to twice the outermost frequency of the Near-Zero IF signal that appears in the analog baseband portion. Then, extraction on a frequency axis is performed by each of the complex bandpass filters 23 provided in the digital baseband unit in a subsequent stage. Then, frequency De-Rotation is applied at the digital frequency converter 24. Then, subsequent MIMO demodulation processing and space division multiplexing can be thereby performed.

By adopting the configuration in this exemplary embodiment, all the features of the present invention, such as fast and stable carrier sensing, avoidance of DC offset jump in the receiver over an entire packet length, and MIMO demodulation, can be provided.

Operation and effects of the exemplary embodiments described above will be described below.

By applying the present invention to the wireless communication apparatus that adopts the direction conversing receiving system (such as: the Multi Band OFDM UWB system compliant with the WiMedia standard used as the PHY in Wireless USB) in which a packet is transmitted or received while performing frequency hopping for each symbol and demodulation is started by performing carrier sensing at the beginning of the packet on the side of the receiver, the following operation and effects are achieved.

By setting LO frequencies in a plurality of the receiving systems provided corresponding to the number of frequency hoppings to be fixed at respective hopping frequencies and by setting each receiving system to be ready for reception, correlation detection at the preamble part at the beginning of the packet received with frequency hopping and carrier sensing can be performed stably at high speed. Hopping synchronization can also be reliably started.

By setting the LO frequencies in the plurality of the receiving systems provided corresponding to the number of frequency hoppings to remain fixed even in AGC, AFC, and synchronization establishment using the preamble part, and the demodulating operation after carrier sensing, the DC offset and DC offset jump can be completely removed before the AD converter.

The DC offset may be the factor for fixed degradation of reception when the direction conversion reception with frequency hopping is performed, and occurs in the received baseband signal due to self-mixing. The DC offset jump occurs immediately after frequency hopping due to insertion of the Ccut (which high-pass filters subcarriers more distant than a subcarrier in the most vicinity of a DC component based on DC Nulling at a time of OFDM) for preventing a DC signal increase when a DC offset level differs for each frequency hopping.

Frequencies of a plurality of LO (Local Oscillator)s in the receiving systems are not hopped for demodulation of the portion from the preamble to the header at the beginning of a packet in order to stably and reliably execute processing at the beginning of the packet. When the payload/data part is demodulated, the frequencies the plurality of the LOs in the receiving systems are bopped, thereby making a transition to a demodulating operation based on the MIMO space division multiplexing. By a further increase in an overall transmission rate, and realization of this increase by low-rate transmission/reception capable of achieving a desired error rate at a required low C/N ratio performed in the form of a plurality of streams in a large bundle, improvement in a reaching distance characteristic is sought. Further, using stream division processing based on singular value decomposition from the propagation matrix, expansion to multi-user MIMO-SDMA (space division multiplexing) also becomes possible. In the multi-user MIMO-SDMA, importance is attached to improvement in accommodation capability within a cell. Especially when the higher speed is realized by increasing frequency utilization efficiency rather than just by bandwidth expansion, the present invention may be effective means for realizing a higher speed to be achieved for the UWB, which has already become an ultra wide band.

For demodulation of the payload/data part after demodulation of the portion from the preamble to the header at the beginning of the packet as well, the frequencies of the plurality of the LOs in the receiving systems may not be hopped, and one of the LO frequencies that becomes just the center flay be selected and set. When demodulation is performed with this frequency configuration, a demodulated symbol for which a transmission hopping frequency and a fixed reception frequency are different appear after the analog baseband portion, as the Near-Zero baseband signal. Thus, extraction on the frequency axis is performed by each complex bandpass filter provided in the digital baseband unit in a stage subsequent to the AD converter. Then, frequency conversion to the Zero-IF baseband is performed by the digital frequency converter. Subsequent MIMO demodulation processing and space division multiplexing can be thereby performed. The present invention is effective in the following respects. The DC offset that may be the factor of fixed degradation of the receiver at the time of direct conversion reception involving frequency hopping and the DC offset jump immediately after the frequency hopping, which occurs by insertion of the DC cut-off capacitance element Ccut into the analog baseband portion can be completely removed over the entire length of a packet. Together with this removal, various features represented by the MIMO space division multiplexing can be performed.

The present invention can be applied to a wireless communication apparatus that adopts the direct conversion receiving scheme in which a packet is transmitted or received while performing frequency hopping for each symbol and carrier sensing is performed at the beginning of the packet on a receiver side, thereby starting demodulation. More specifically, the present invention can be applied to PHY portions of a system, various cellular terminals, an AV device, and a PC host device compliant with higher-level Protocol Adaptation Layer (PAL) specifications such as Wireless USB, Bluetooth v3.0. Wireless 1394, and WLP/WiNET that adopts a PHY/MAC layer of the Multi Band OFDM UWB system compliant with the WiMedia standard as a common platform.

Each disclosure of Patent Documents described above is incorporated herein by reference. Modifications and adjustments of examples or exemplary embodiments are possible within the scope of the overall disclosure (including claims) of the present invention, and based on the basic technical concept of the invention. Various combinations and selections of various disclosed elements are possible within the scope of the claims of the present invention. That is, the present invention of course includes various variations and modifications that could be made by those skilled in the art according to the overall disclosure including the claims and the basic technical concept.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A wireless communication apparatus of a direct conversion receiving scheme in which a packet is transmitted or received while performing frequency hopping for each symbol, and demodulation is started by performing carrier sensing at a beginning of the packet on a receiving side, the apparatus comprising:
a plurality of receiving systems provided in accordance with a number of frequency hoppings, each of the plurality of receiving systems, setting a local oscillation frequency thereof to be fixed at a hopping frequency; and
a digital baseband unit that performs carrier sensing using a predetermined number of symbols in a preamble part at the beginning of the packet, received with frequency hopping, and that performs demodulation of a payload data part after an operation from hopping pattern detection to hopping synchronization,
wherein each of the receiving systems includes a variable band low-pass filter provided in a baseband portion of the receiving system, a cut-off bandwidth of the variable band low-pass filter of the receiving system being set to be a narrow bandwidth, during processing and demodulation of a portion from a preamble part to a header part.

2. A wireless communication apparatus of a direct conversion receiving scheme in which a packet is transmitted or received while performing frequency hopping for each symbol, and demodulation is started by performing carrier sensing at a beginning of the packet on a receiving side, the apparatus comprising:
a plurality of receiving systems;
a control unit that performs control to cause a plurality of local oscillation signals of the a plurality of receiving systems not to be frequency hopped at a time of demodulation of a portion from a preamble to a header at the beginning of the packet, the control unit performing control to cause a plurality of local oscillation signals of the a plurality of receiving systems to be frequency hopped at a time of demodulation of a payload data part to make a transition to a demodulating operation based on MIMO (Multiple Input Multiple Output) space division multiplexing.

3. The wireless communication apparatus according to claim 2, wherein each of the receiving systems includes a variable band low-pass filter which is provided in a baseband portion of the receiving system, a cut-off bandwidth of which is set to be a narrow bandwidth during processing and demodulation of a portion from a preamble part to a header part.

4. A wireless communication apparatus of a direct conversion receiving scheme in which a packet is transmitted or received while performing frequency hopping for each symbol, and demodulation is started by performing carrier sensing at a beginning of the packet on a receiving side, the apparatus comprising:
a plurality of receiving systems,
a control unit that performs control to cause a plurality of local oscillation signals of the plurality of receiving systems not to be frequency hopped at a time of demodulation of a portion from a preamble to a header at the beginning of the packet, the control unit that performing control to cause the plurality of local oscillation signals of the plurality of receiving systems not to be frequency hopped also at a time of demodulation of a payload data part following the demodulation of the portion from the preamble to the header and to select, with a center frequency from among frequencies of the local oscillation signals being selected and applied in common to entire local oscillation signals of the plurality of receiving systems to perform a demodulating operation based on MIMO (Multiple Input Multiple Output) space division multiplexing.

5. The wireless communication system according to claim 4, wherein the receiving system comprises:
an analog-to-digital converter which converts an analog baseband signal to a digital baseband signal; and
a digital baseband unit provided after the analog-to-digital converter, the digital baseband unit including a complex bandpass filter and a plurality of digital frequency converters, and wherein
the local oscillation signals of the receiving systems are fixed at one frequency in the center of the frequencies of the local oscillation signals, and, when a symbol in a time zone where a transmission hopping frequency is a frequency other than the frequency of the local oscillation signals is demodulated, a cut-off bandwidth of the variable-band low-pass filter in each of the receiving systems is widened or narrowed to allow reception of a near zero intermediate (Near Zero IF) baseband signal responsive to a difference between the transmission hopping frequency and the frequency of the local oscillation signals after the analog-to-digital converter,
the complex bandpass filter and the digital frequency converter in the digital baseband unit extracting and demodulates modulated symbols corresponding to zero frequency and positive and negative baseband frequencies.

6. A reception method of wireless communication using a direct conversion receiving scheme in which a packet is transmitted or received while performing frequency hopping for each symbol, and demodulation is started by performing carrier sensing at a beginning of the packet on a receiving side, the method comprising:
setting a frequency of a local oscillator in each of a plurality of receiving systems to be fixed at each hopping frequency, the plurality of receiving systems being provided in accordance with a number of frequency hoppings;

performing carrier sensing by a digital baseband unit using a predetermined number of symbols in a preamble part at the beginning of the packet received with frequency hopping;

demodulating a payload data part after an operation from hopping pattern detection to hopping synchronization on the receiver; and setting a cut-off bandwidth of a variable band low-pass filter included in a baseband portion in each of the receiving systems to be narrow during processing on and demodulation of a portion from the preamble part to a header part.

7. A reception method of wireless communication based on a direct conversion receiving scheme in which a packet is transmitted or received while performing frequency hopping for each symbol, and demodulation is started by performing carrier sensing at a beginning of the packet on a receiving side, the method comprising:

causing a plurality of local oscillation signals of receiving systems to be not frequency hopped at a time of demodulation of a portion from a preamble to a header at the beginning of the packet; and causing local oscillation signal of each receiving system to be frequency hopped at a time of demodulation of a payload data part, to make a transition to a demodulating operation based on MIMO (Multiple Input Multiple Output) space division multiplexing.

8. The reception method according to claim 7, comprising setting a cut-off bandwidth of a variable band low-pass filter included in a baseband portion in each of the receiving systems to be narrow during processing on and demodulation of a portion from the preamble part to a header part.

9. A reception method of wireless communication based on a direct conversion receiving scheme in which a packet is transmitted or received while performing frequency hopping for each symbol, and demodulation is started by performing carrier sensing at a beginning of the packet on a receiving side, the method comprising:

causing a plurality of local oscillation signals in a plurality of receiving systems to be not hopped at a time of demodulation of a portion from a preamble to a header at the beginning of the packet; and causing the plurality of local oscillation signals in the plurality of receiving systems to be not hopped also at a time of demodulation of a payload data part following the demodulation of the portion from the preamble to the header and selecting a center frequency from among frequencies of the local oscillation signals and applying in common to entire local oscillation signals in the plurality of receiving systems to perform a demodulating operation based on MIMO (Multiple Input Multiple Output) space division multiplexing.

10. The reception method according to claim 9, comprising:

fixing entire local oscillation signals in the plurality of receiving systems at one frequency in the center of the frequencies of the local oscillation signals;

when a symbol in a time zone where a transmission hopping frequency is a frequency other than the frequency of the local oscillation signals is demodulated, widening or narrowing a cut-off bandwidth of a variable-band low-pass filter provided in a baseband portion in each of the receiving system, thereby allowing reception of a near zero intermediate (Near Zero IF) baseband signal responsive to a difference between the transmission hopping frequency and the frequency of the local oscillation signals after an analog-to-digital converter; and providing in each of the plurality of receiving systems a complex bandpass filters and a digital frequency converter in a digital baseband unit after the analog-to-digital converter, extracting and demodulating modulated symbols corresponding to zero frequency and positive and negative baseband frequencies.

* * * * *